(12) United States Patent
Pathak et al.

(10) Patent No.: US 12,487,803 B1
(45) Date of Patent: Dec. 2, 2025

(54) DOCUMENT MANAGEMENT FOR AN ELECTRONIC DOCUMENT USING A DECLARATIVE EXPECTATION

(71) Applicant: DocuSign, Inc., San Francisco, CA (US)

(72) Inventors: Avanish Pathak, Rochester, NY (US); Mason Alexander Chinkin, El Cerrito, CA (US); Bhargav Krishna, Snohomish, WA (US); Nicholas James Bolles, Wausau, WI (US); Matthew Ritchie, Walnut Creek, CA (US)

(73) Assignee: Docusign, Inc., San Francisco, CA (US)

( * ) Notice: Subject to any disclaimer, the term of this patent is extended or adjusted under 35 U.S.C. 154(b) by 130 days.

(21) Appl. No.: 18/240,956

(22) Filed: Aug. 31, 2023

(51) Int. Cl.
*G06F 3/0484* (2022.01)
*G06F 3/01* (2006.01)
(Continued)

(52) U.S. Cl.
CPC ............... *G06F 8/60* (2013.01); *G06F 16/93* (2019.01); *G06F 16/986* (2019.01)

(58) Field of Classification Search
CPC .......... G06F 8/60; G06F 16/93; G06F 16/986; G06F 8/65; G06F 11/3698; G06F 9/485; G06F 9/3836; G06F 8/61; G06F 9/45529; G06F 8/38; G06F 21/6218; G06F 9/44526; G06F 9/451; G06F 8/71; G06F 40/166; G06F 21/64; G06F 40/169; G06F 9/3017; G06F 40/117; G06F 21/316; G06Q 10/103; G06Q 20/3825; G06Q 20/384;
(Continued)

(56) References Cited

U.S. PATENT DOCUMENTS 10,963,477 B2 * 3/2021 Prophete ............... G06F 16/904
11,947,775 B2 * 4/2024 Bar-On ................ G06Q 10/107
(Continued)

OTHER PUBLICATIONS

DocuSign, "OpenAPI (Swagger) files", DocuSign Developer, 2 pp., Retrieved from the Internet on Nov. 28, 2023 from URL: https://developers.docusign.com/tools/openapi-files/.

*Primary Examiner* — Thuy Dao
(74) *Attorney, Agent, or Firm* — Shumaker & Sieffert, P.A.

(57) ABSTRACT

A system for deploying a software application associated with document management includes processing circuitry and computer-readable storage media. The computer-readable storage media includes logic that, when executed, causes the processing circuitry to receive a request, from a client device, to execute a software application for managing an electronic document. The software application is configured to execute using at least a first widget and a second widget. The logic further causes the processing circuitry to generate instructions for executing the software application at the client device. The instructions are configured to cause the client device to generate contextual information for the first widget and to cause the client device to determine whether the contextual information satisfies a declarative expectation for the second widget. The logic further causes the processing circuitry to output, to the client device, the instructions to execute the software application for managing the electronic document.

20 Claims, 16 Drawing Sheets

(51) Int. Cl.
  *G06F 8/60* (2018.01)
  *G06F 9/38* (2018.01)
  *G06F 9/445* (2018.01)
  *G06F 9/455* (2018.01)
  *G06F 16/248* (2019.01)
  *G06F 16/93* (2019.01)
  *G06F 16/958* (2019.01)

(58) Field of Classification Search
  CPC ..... H04L 9/32; H04L 63/1425; H04L 63/126; B42D 25/23; B42D 25/305
  See application file for complete search history.

(56) References Cited

U.S. PATENT DOCUMENTS

2006/0212708 A9* 9/2006 Wong .................... H04L 9/3247
  713/176
2015/0150090 A1* 5/2015 Carroll .................... G06F 21/64
  726/3
2016/0048696 A1* 2/2016 Follis .................... G06F 21/645
  726/28

* cited by examiner

DOCUMENT MANAGEMENT FOR AN ELECTRONIC DOCUMENT USING A DECLARATIVE EXPECTATION

TECHNICAL FIELD

This disclosure relates generally to management of a software application for an electronic document.

BACKGROUND

Continuous integration and continuous integration and continuous deployment (CI/CD) environments implemented by software development teams typically include utilities for software developers to upload and deploy a software application. Current CI/CD environments generally involve software applications developed by various teams. CI/CD environments generally rely on a server hosting the software application to restart every time a new version of the software application is deployed.

SUMMARY

The disclosure describes techniques, devices, and systems for deploying a software application associated with document management. Software applications associated with document management may include, for example, user experiences related to managing electronic or electronic documents (e.g., generate a document, sign a document, etc.). Software developers may create, update, integrate, deploy, and/or otherwise develop software applications via a continuous integration and continuous deployment ("CI/CD") environment. Software applications are deployed when the CI/CD environment allows client devices to request and access files and data included in the software applications. Using the CI/CD environments may help to implement a common knowledge base that may help to ensure compatibility of all software components (e.g., widgets and/or plugins) used in software application development and runtime deployment.

In accordance with the techniques of the disclosure, a system may generate instructions that cause a client device (e.g., a user's mobile device or personal computing device) to determine whether contextual information for a first widget for executing a software application satisfies a declarative expectation for a second widget for executing the software application. In this way, the techniques described herein may allow code developed by software developers to be verified at runtime, which may help to identify errors in the code and/or self-help errors in the code. A declarative expectation may be referred to herein as a "contract." The contract may be a declarative and/or schematic way for a child widget to communicate expected data for ingestion by the child widget. Computing systems may analyze data that is being sent from host widgets and compare to the declarative expectation from child widget to potentially ensure the validity and/or integrity of the contract is still intact.

In one example, the present disclosure describes a system for deploying a software application associated with document management. The system may comprise processing circuitry and non-transitory computer-readable storage media comprising logic that, when executed, causes the processing circuitry to receive a request, from a client device, to execute a software application for managing an electronic document. The software application is configured to execute using at least a first widget and a second widget. The logic further causes the processing circuitry to, in response to the request, generate instructions for executing the software application at the client device. The instructions are configured to cause the client device to generate contextual information for the first widget and to cause the client device to determine whether the contextual information satisfies a declarative expectation for the second widget. The logic further causes the processing circuitry to output the instructions to execute the software application for managing the electronic document.

In another example, the present disclosure describes a method for deploying a software application associated with document management. The method may comprise receiving by one or more processing circuitries, a request, from a client device, to execute a software application for managing an electronic document. The software application is configured to execute using at least a first widget and a second widget. The method further includes, in response to the request, generating, by one or more the processing circuitries, instructions for executing the software application at the client device. The instructions are configured to cause the client device to generate contextual information for the first widget and to cause the client device to determine whether the contextual information satisfies a declarative expectation for the second widget. The method further may further include outputting, by one or more the processing circuitries, to the client device, the instructions to execute the software application for managing the electronic document.

In one example, computer-readable storage media includes logic that, when executed, configures processing circuitry to receive a request, from a client device, to execute a software application for managing an electronic document. The software application is configured to execute using at least a first widget and a second widget. The logic further configures the processing circuitry to, in response to the request, generate instructions for executing the software application at the client device. The instructions are configured to cause the client device to generate contextual information for the first widget and to cause the client device to determine whether the contextual information satisfies a declarative expectation for the second widget. The logic further configures the processing circuitry to output, to the client device, the instructions to execute the software application for managing the electronic document.

In one example, the present disclosure describes a system including processing circuitry and non-transitory computer-readable storage media comprising logic that, when executed, causes the processing circuitry to receive a request, from a client device, to execute a software application. The software application is configured to execute using at least a first widget and a second widget. The logic further causes the processing circuitry to, in response to the request, generate instructions for executing the software application at the client device. The instructions are configured to cause the client device to generate contextual information for the first widget and to cause the client device to determine whether the contextual information satisfies a declarative expectation for the second widget. The logic further causes the processing circuitry to output the instructions to execute the software application.

In another example, the present disclosure describes a method including receiving by one or more processing circuitries, a request, from a client device, to execute a software application. The software application is configured to execute using at least a first widget and a second widget. The method further includes, in response to the request, generating, by one or more the processing circuitries, instructions for executing the software application at the client device. The instructions are configured to cause the client device to generate contextual information for the first widget and to cause the client device to determine whether the contextual information satisfies a declarative expectation for the second widget. The method further may further include outputting, by one or more the processing circuitries, to the client device, the instructions to execute the software application.

In one example, computer-readable storage media includes logic that, when executed, configures processing circuitry to receive a request, from a client device, to execute a software application. The software application is configured to execute using at least a first widget and a second widget. The logic further configures the processing circuitry to, in response to the request, generate instructions for executing the software application at the client device. The instructions are configured to cause the client device to generate contextual information for the first widget and to cause the client device to determine whether the contextual information satisfies a declarative expectation for the second widget. The logic further configures the processing circuitry to output, to the client device, the instructions to execute the software application.

The details of one or more examples are set forth in the accompanying drawings and the description below. Other features, objects, and advantages of the disclosure will be apparent from the description and drawings, and from the claims.

DETAILED DESCRIPTION

Figure 1:
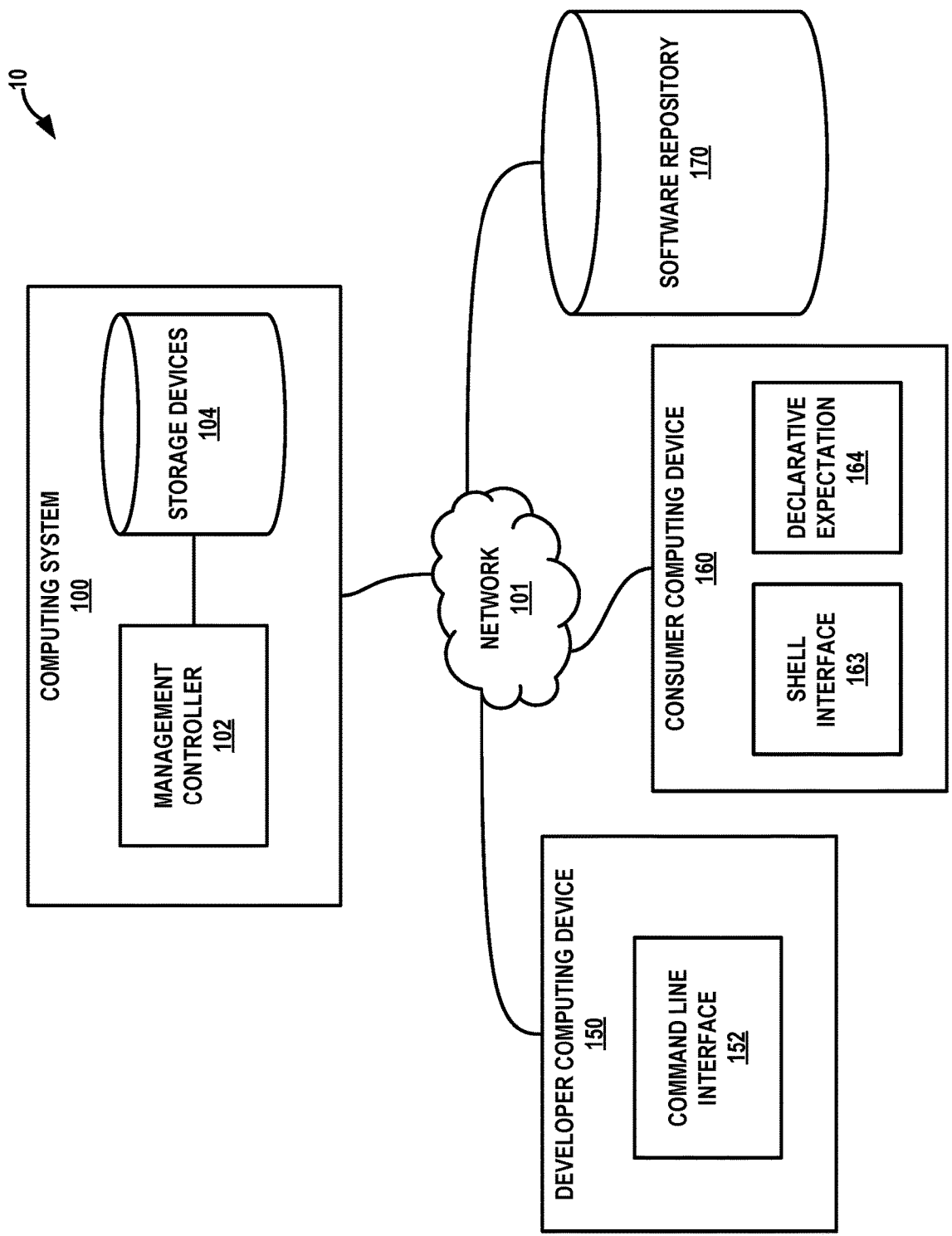
FIG. 1 is a block diagram illustrating an example computing environment for managing deployment of a software application, in accordance with techniques of this disclosure.

In general, aspects of the present disclosure describe techniques for deploying a software application associated with document management. Software applications (e.g., an application provided via a browser or operating system of a client device) associated with document management may include one or more user experiences related to managing electronic or digital documents (e.g., generate an electronic document, sign an electronic document, etc.). Software applications may be deployed with multiple widgets. A widget may refer to a collection of software code used by the software application to provide a user experience (e.g., create a new Portable Document Format (PDF) file, open a PDF file, etc.). For example, a widget may include a snippet of JavaScript® logic that runs in a web browser. Software developers may create, update, integrate, deploy, or otherwise develop widgets for software applications via a continuous integration and continuous deployment ("CI/CD") environment.

Software developers may use the CI/CD environment to deploy a new version of a software application or a software application component (e.g., widget) by instructing consumer devices to load code files associated with the new versions of the software application or software application component. A CI/CD computing system may dynamically deploy new versions of a software application component (e.g., widget) during runtime and/or execution of a software application implementing the software application component. The CI/CD computing system may dynamically deploy new versions of widgets without restarting a server hosting the software application component and/or without using a load balancer.

The CI/CD computing system may dynamically deploy a new version of a widget by, for example, progressively sending instructions to requesting client devices to execute the new version of the widget. For example, the CI/CD computing system may send instructions to execute a new version of a widget by specifying an identifier and/or an address (e.g., a uniform resource indicator) associated with the new version of the widget in a configuration file included in the instructions to execute a requested software application implementing the widget. In this way, the CI/CD computing system may manage deployment of new versions of software application components without implementing load balancers.

In an example CI/CD computing system, a singular application shell (e.g., a shell interface) may allow for potentially an unlimited number of distributed applications (e.g., widgets) that can potentially host an unlimited number of child widgets in a completely modular way. This may be referred to herein as runtime loading and rendering of widgets. The shell, when executed by processing circuitry, can, based on one or more conditions, create dynamic experiences on a website to stitch together multiple widgets in real time. The shell can load child widgets by, for example, invoking a central utility function offered by the shell and use initial data for hydration and/or bootstrapping of the experience offered by the shell. In this way, the CI/CD computing system may provide one or more of the following benefits: (1) ensure one or more parent widgets are able to customize certain behaviors in a child widget; (2) prevent redundancy of the same business logic; (3) pass along relevant contextual data that might already exist in the parent widget and might be needed in the child widget; and/or (4) at the time of making this request to the shell, the host widget may pass the identifier (ID) of the child widget and pass any additional data the child might use to initialize/bootstrap/start/setup. The shell may load the initialization scripts and/or hydrate the fragmented application code referred to by the child widget, before passing the child's data dependencies on the host.

A computing system configured to provide potentially unlimited freedom for applications to host and/or be hosted may carry data dependency risks. In some examples, the child widget's data dependency on the host may be an important point of failure that may be monitored and/or enforced as a "contract." The freedom of the architecture to provide potentially unlimited freedom for applications to host and/or be hosted may include a risk that a change to a host widget or a child widget may results in an unintended violation of the contract, potentially breaking functionality and/or negatively impacting users (e.g., a user of a client device, or more specifically, for example, a consumer computing device). Computing systems may be configured to support client devices with differing configurations (e.g., operating system types and version, browser types and versions, and/or hardware) and to provide freedom for applications to host and be hosted may benefit from running contract validation at runtime. For example, in some systems, it is not practical for developers to test all possible combinations of configurations of a client device and/or all combinations of host/child widgets before deploying a new version of a widget. As such, the freedom in the computing system for host widgets and/or child widgets to release independent of each other may prevent contract validation from happening at build time (e.g., pre-deployment). In an example where a host widget is regularly developed and released and a child widget is a stable rarely developed application, the computing system may only detect a problem at runtime, when the host widget has been deployed to an environment where the data passed to the child widget is violating the contract.

A computing system may provide passive enforcement with clear alerting. An example challenge is long term maintainability of the contract. A developer team might "own" dozens of widgets (e.g., small applications). In this example, some of the widgets owned by the developer team might be stable, rarely updated, and hosted in dozens of host widgets (e.g., other applications). The computing system may implement enforcement passively on the ecosystem level, for example, not manually for each widget (e.g., application). In this way, the developer team may not be necessarily burdened with manual enforcement. Moreover, the computing system may potentially operate with higher reliability and/or with fewer outages by, for example, automatically (e.g., without human input), enforcing a contract (e.g., a declarative expectation).

A shell (e.g., executing at a client device) may be positioned to execute runtime validation of host and/or child contracts. In accordance with the techniques of the disclosure, a child widget may declare one or more contract definitions (e.g., one or more declarative expectations) that are accessible to the shell. The contract definitions (e.g., the one or more declarative expectations) can, for example, not only serve as a reference for consumers of a child widget but also provide the basis for runtime validation. The shell may compare the data (e.g., contextual data) offered by the host widget against the contract definition advertised by the child widget. In the event where the data passed compared to the data expected mismatches, the shell may have detected an anomaly and can take meaningful actions towards alerting a computing system and/or potentially self-healing the anomaly.

A computing system may provide alerting of a contract violation (e.g., violation of at least one declarative expectation). At the time a host widget requests a child widget, the shell may have access to the child widget identifier (ID) and the context in which the child widget is being loaded. If a host and/or child contract violation is detected, the shell and/or the computing system may send one or more alerts the host widget and child widget owners. For instance, a consumer computing device may output an indication of the alert to a computing system, which outputs the alert to a developer computing device for display to a developer of the host widget and/or to a developer computing device for display to a developer of the child widget. In this example, the developers may more quickly correct the anomaly compared with systems that do not generate the alert, which may reduce an amount of time that a system is operating with the anomaly.

A computing system may provide a notification. In lower environments (e.g., prior to a production environment), the shell may render visible warning overlays with an "acknowledge" button for developers to click. That button may have telemetry to serve as evidence that the host and/or child developer team was aware of the issue (e.g., potential anomaly). In higher environments (e.g., production), the computing system may generate alerts to notify the on call engineer for host and/or child widgets that are failing the runtime validation of their contract. The alert may clearly indicate one or more of the host widget, the child widget, how the contract has been violated, or any other useful information.

In accordance with the techniques of the disclosure, a client device, executing a shell, and/or the computing system may provide self-healing. In production instances (e.g., a production environment), a child widget released with an offending change (e.g., a change that results in a mismatch between data and a contract) to consuming widgets (e.g., a child widget of a widget) may impact live customers (e.g., service outages) and/or potentially resulting in lost revenue. In this example, the client device, executing the shell, may attempt to call a deconfliction service. The deconfliction service may leverage a large language model (LLM) service or another deep learning process to help to consume the data passed by the parent widget, the contract schema advertised by the now changed child widget and/or apply deconfliction logic. The deconfliction logic may attempt to map the keys between data passed compared to the data expected in the contract. The deconfliction service may apply models (e.g., machine learning models) to map deltas (e.g., changes) by looking at similarities between one or more of key names, values, and/or data type, etc.

The techniques described herein may provide one or more technical advantages that realize one or more practical applications. For example, a computing system when outputting a declarative expectation for a widget may more quickly detect errors when deploying a software application compared to systems that do not use a declarative expectation. For example, rather than relying solely on manual review, the computing system may cause a client device to actively and/or automatically (e.g., without human input) verify that contextual information for ingestion by a widget satisfies one or more declarative expectations for the widget, to help to ensure that the widget executes successfully. More quickly detecting errors may result in the computing system and/or the client device performing fewer unnecessary calculations to provide a software applications, which may reduce a computational burden of the computing system and/or the client device. In some examples, the computing system may help to provide a self-heal process to correct a data mismatch between contextual information for ingestion by a widget and a declarative expectation for the widget, which may potentially reduce or eliminate outages and may further reduce processing burden of the computing system and/or the client device.

FIG. 1 is a block diagram illustrating an example computing environment 10 for managing deployment of a software application, in accordance with techniques of the disclosure. In the example of FIG. 1, computing environment 10 includes computing system 100, network 101, developer computing device 150, consumer computing device 160, and software repository 170. Computing environment 10 may represent a CI/CD environment for developers to write and release software applications. Computing environment 10 may include a starter kit, utilities, standard development kits, application programming interfaces, or other developer resources. Computing system 100 may manage the developer resources to help developers upload code to a repository that is compatible with other code in the repository. In some examples, computing system 100 may represent a cloud computing system that provides one or more services via network 101. Computing system 100 may include a collection of hardware devices, software components, and/or data stores that can be used to implement one or more applications or services provided to developer computing device 150 and consumer computing device 160 via network 101. Computing system 100 may represent a cloud-based implementation. As used herein, a client device may refer to developer computing device 150, consumer computing device 160, or a device that performs the function of both developer computing device 150 and consumer computing device 160.

Network 101 may include the Internet or may include or represent any public or private communications network or other network. For instance, networks 101 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 101 using any suitable communication techniques. Network 101 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1 may be operatively coupled to network 101 using one or more network links. The links coupling such devices or systems to network 101 may be Ethernet, Asynchronous Transfer Mode (ATM) or other types of network connections, and such connections may be wireless and/or wired connections. One or more of the devices or systems illustrated in FIG. 1 or otherwise on network 101 may be in a remote location relative to one or more other illustrated devices or systems.

Computing system 100, developer computing device 150, consumer computing device 160, and software repository 170 may send and receive data via network 101. Data exchanged over the network 101 may be represented using any suitable format, such as hypertext markup language (HTML), extensible markup language (XML), or JavaScript Object Notation (JSON). In some aspects, network 101 may include encryption capabilities to ensure the security of documents. For example, encryption technologies may include secure sockets layers (SSL), transport layer security (TLS), virtual private networks (VPNs), and Internet Protocol security (IPsec), among others.

Examples of developer computing device 150 and consumer computing device 160 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), etc. Developer computing device 150 and consumer computing device 160 may be examples of client devices that may interact with computing system 100 to upload, use, or otherwise access software applications managed by computing system 100.

Developer computing device 150 may include command line interface 152. Developer computing device 150 may be operated by a software developer who may upload and access code for a software application based on configuration information received from computing system 100. Command line interface 152 may provide an interactive environment for developers to develop and deploy software applications. Command line interface 152 may include, but is not limited to, a shell terminal or application programming interface managed by computing system 100. As used herein, a shell terminal may refer to a software program that acts as command-line interpreter for services related to an application provided by computing system 100. For example, command line interface 152 may process commands (e.g., user inputs) received by developer computing device 150 to generate instructions and output, via network 101, the instructions to computing system 100 and/or to software repository 170. For instance, developer computing device 150 may use command line interface 152 to upload software code to software repository 170.

Developer computing device 150 may pull software applications and resources associated with the software applications from software repository 170. Software repository 170 may include, but is not limited to, a content delivery network, cloud storage systems, or any collection of databases used to store and send software files. For example, software repository 170 may be a content delivery network that implements Microsoft Solutions Framework®.

Consumer computing device 160 may include shell interface 162 and declarative expectation 164. Consumer computing device 160 may be a computing device operated by a consumer of software applications managed by computing system 100. Shell interface 162 may include, but is not limited to, a web browser or user interface that may request data from computing system 100 and software repository 170 via network 101. Declarative expectation 164 may be a contract that communicates to the consumer computing device 160 expected contextual information. For example, consumer computing device 160 may analyze, using declarative expectation 164, contextual data to help to help to ensure the contextual data output by a host widget is suitable for ingestion by a child widget. Consumer computing device 160 may request access to a software application with shell interface 162 (e.g., a browser shell interface and/or application interface). For example, consumer computing device 160 may request a software application to manage electronic documents with shell interface 162.

Techniques described herein may apply a common knowledge base (e.g., computing system 100) to regulate network traffic to new versions of software applications. In this way, the techniques help to reduce or eliminate restarting a host of a software application when a new version of the software application is deployed. The techniques described herein may help to improve an availability of software repository 170, which may potentially improve a user's experience using the software applications. The techniques described herein may send consumer computing device 160 instructions to execute a new version of a software application without interrupting the experience of a user operating consumer computing device 160 while executing the new version of the software application.

In the example of FIG. 1, computing system 100 may include one or more servers locally managed by a software administrator or a distributed or cloud-based computing system managed by the software administrator. Computing system 100 may include one or more computing devices, servers, databases, etc. communicably coupled to perform the techniques described herein. Computing system 100 may include management controller 102 and storage devices 104. Management controller 102 may be a module with instructions to manage new and/or updated software applications. For example, management controller 102 may be configured to upload and/or update configuration files associated with widget configuration information used to implement a software application. Management controller 102 may store new and/or updated configuration files associated with widget configuration information in storage devices 104. Storage devices 104 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support computing system 100. Functionality of management controller 102 and storage devices 104, as described herein, may be distributed across multiple computing devices within the distributed or cloud-based environment of computing system 100.

In accordance with the techniques of the disclosure, computing system 100 may receive a request from consumer computing device 160 to execute a software application for managing an electronic document. Management controller 102 may generate instructions for executing the software application at consumer computing device 160. Management controller 102 may output instructions to consumer computing device 160. For example, computing system 100 may output instructions to consumer computing device 160 that causes consumer computing device 160 to load a child widget. Consumer computing device 160 may analyze contextual information sent from a host widget against declarative expectation 164 for the child widget. Declarative expectation 164 may be accessible by computing environment 10 at the time the host widget requests the child widget. For example, consumer computing device 160 may, when executing the host widget to generate contextual data, may have access to declarative expectation 164 (e.g., pre-downloaded). Declarative expectation 164 may help to serve as a reference for consumer computing device 160 and/or provide a basis for runtime validation. In some instances, contextual information passed by a host widget may mismatch declarative expectation 164 and computing environment 10 (e.g., computing system 100) may notify and/or alert a child widget owner and/or a host widget owner. Computing environment 10 (e.g., one or more of computing system 100, consumer computing device 160, or another computing component) may apply lingual analysis to, for example, self-heal a data mismatch. For example, consumer computing device 160 may work with cloud-based processing circuitry (e.g., implemented by computing system 100 or another computing system) to perform self-healing (e.g., apply lingual analysis). Computing environment 10 may use lingual analysis to dynamically bind the data from host widget to declarative expectation 164 to help to translate the data output by the host widget to modified data that is compliant with declarative expectation 164. In this example, computing environment 10 may send the expected modified data to the child widget for ingestion and not send the unmodified data generated by the host widget, which may help to allow the child widget to behave as expected.

In operation, computing system 100 may receive, from consumer computing device 160, a request to execute a software application for managing an electronic document. In this example, the software application is configured to execute using at least a first widget and a second widget. Computing system 100 may generate instructions for executing the software application at consumer computing device 160. In this example instructions are configured to cause the consumer computing device 160 to generate contextual information for the first widget, the first widget may be a plugin indicating a UI or the first widget may be a plugin without a UI, and the instructions cause the consumer computing device 160 to determine whether the contextual information satisfies a declarative expectation for the second widget. The first widget may be a host to the second widget. The first widget may not be a child or may be a child to another widget. In some examples, instructions may be HTML/JAVASCRIPT.

In response to a determination that the contextual information satisfies the declarative expectation for the second widget, the instructions may cause consumer computing device 160 to run the second widget using the contextual information. In response, however, to a determination that the contextual information satisfies the declarative expectation for the second widget, the instructions may cause consumer computing device 160 to output a notification indicating that the contextual information does not satisfy the declarative expectation. Computing system 100 may forward an indication of the notification to developer computing device 150. In this way, a developer of the first widget and/or the second widget may be notified that the contextual information generated by the first widget does not satisfy the declarative expectation for the second widget. In some examples, computing environment 10 may perform a self-healing process to correct the mismatch between the contextual information generated by the first widget and the declarative expectation for the second widget. For example, consumer computing device 160 and/or computing system 100 may map a label "DocumentID" of contextual data with a label "DocID" of the declarative expectation, which may allow the second widget to successfully execute.

Figure 2:
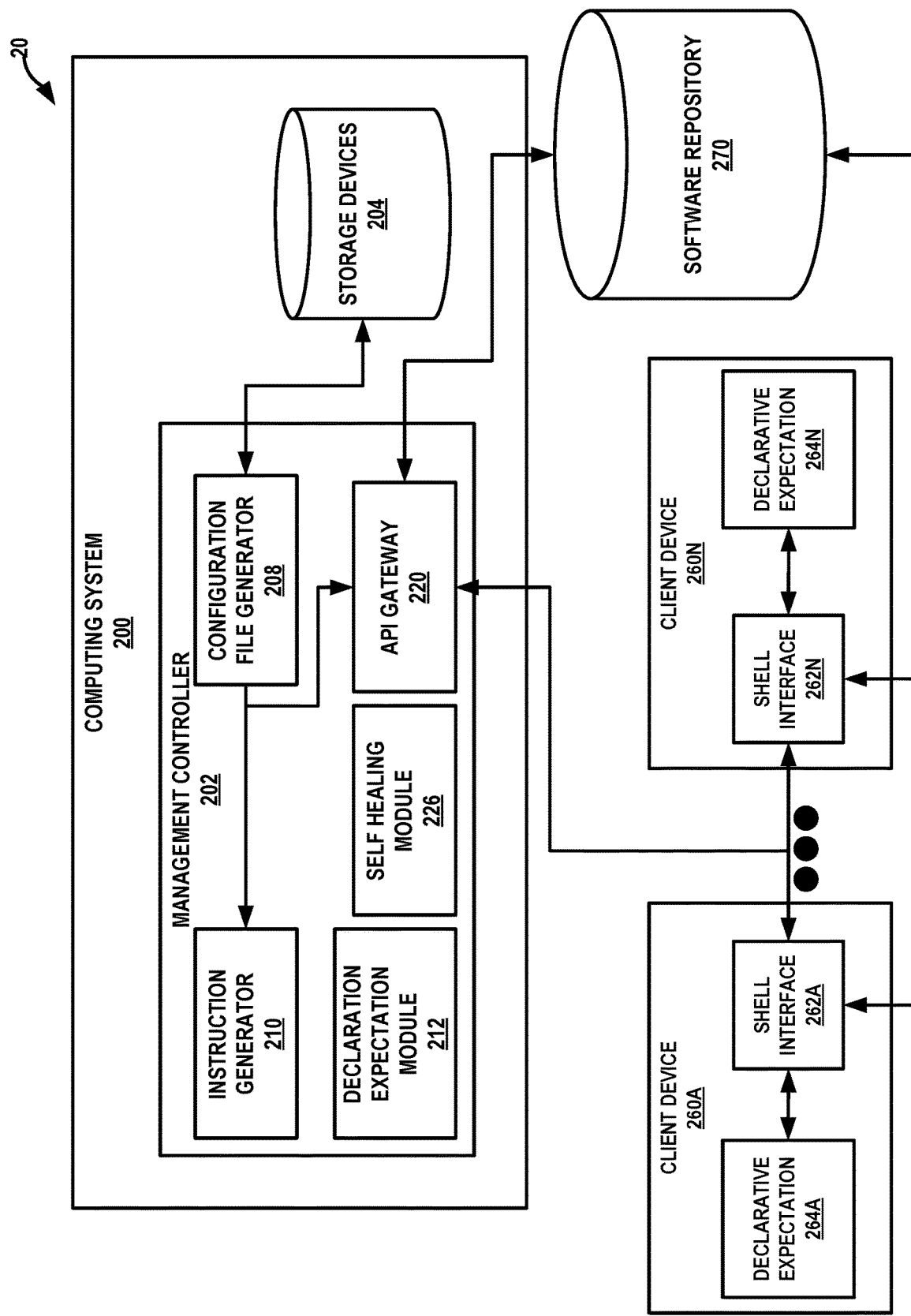
FIG. 2 is a block diagram illustrating an example computing environment with example details of a computing system managing deployment of software applications, in accordance with the techniques of this disclosure.

FIG. 2 is a block diagram illustrating an example computing environment 20 for managing software applications, in accordance with the techniques of this disclosure. In the example of FIG. 2, computing environment 20 may include computing system 200, client devices 260A-260N (hereinafter, client devices 260), and software repository 270. Computing system 200, client devices 260 and software repository 270 of FIG. 2 may be described as an example or alternate implementation of computing system 100, consumer computing device 160, and software repository 270 of FIG. 1, respectively. One or more aspects of FIG. 2 may be described herein within the context of FIG. 1 for example purposes only. Computing system 200, client devices 260A-260N, and software repository 270 may be communicably coupled via network 101 of FIG. 1, for example.

Management controller 202 may include instruction generator 210, instructions and configuration file generator 208, and Application Programming Interface (API) Gateway 220. Instruction generator 210 may generate the HTML/JAVASCRIPT to cause the client device to use the configuration file and declarative expectation. A developer computing device (e.g., developer computing device 150 of FIG. 1) may upload a new version of a widget to software repository 270. Developer computing device 150 may, for example, upload a new version of a widget as a build artifact. Developer computing device 150 may upload the new version of the widget as a build artifact by wrapping the new version of the widget in a standardized format. Developer computing device 150 uploading the new version of the widget as a build artifact ensures that the new version of the widget is compatible with all other widgets managed by computing system 200.

Configuration file generator 208 may detect whether the new version of a widget has been uploaded to software repository 270. In some instances, configuration file generator 208 may poll software repository 270 periodically (e.g., every three seconds) or based on an event (e.g., product launch). In some examples, configuration file generator 208 may automatically poll and retrieve configuration information associated with an uploaded version of a widget. In this way, software repository 270 does not require customization to send notifications to computing system 200 that a new version of a widget has been uploaded. Configuration file generator 208 may use API Gateway 220 to retrieve configuration information associated with the new version of the widget. In some instances, configuration file generator 208 may only retrieve configuration information of widgets that have been uploaded in a standardized format (e.g., a build artifact).

Configuration file generator 208 may generate a configuration file for a widget based on widget configuration information retrieved from software repository 270. Configuration file generator 208 may generate a configuration file that is a structured representation of widget configuration information. For example, configuration file generator 208 may generate the configuration file to identify, for each widget of an application, a version of each widget and a respective location of where the corresponding version of each widget is stored. In some examples, the configuration file may include the version and one or more of a widget identifier, versions of widget dependencies, a uniform resource indicator (see FIG. 5). Configuration file generator 208 may generate a deployment-ready configuration file for an uploaded widget responsive to the uploaded widget satisfying quality assurance and security tests. For instance, configuration file generator 208 may generate a deployment-ready configuration file for an uploaded widget only when the uploaded widget satisfies quality assurance and security tests. Configuration file generator 208 enables developers to request that the system provides new or undeployed versions of each widget for testing. Configuration file generator 208 may store configuration files in storage devices 204. Storage devices 204 may represent computer readable media, for example, physical memory stored in a data center or storage provided by a cloud storage system.

Configuration file generator 208 may generate configuration files for a software application in real time. Configuration file generator 208 may generate the configuration files for the software application in response to a new version of a widget implemented by the software application satisfying any pre-deployment requirements (e.g., quality assurance and security tests). For example, configuration file generator 208 may maintain a configuration file for a software application implementing a current version of a widget, as well as generate a configuration file for the same software application with indications that the software application should be implemented with the new version of the widget. In this way, configuration file generator 208 may support testing of new versions of the widget in a pre-deployment environment.

Management controller 202, and more specifically instruction generator 210, may receive requests from client devices 260 to access a software application. Client devices 260 may request access to the software application with shell interfaces 262A-262N (hereinafter, shell interfaces 262). Shell interfaces 262, when executed by processing circuitry, may send a request to access the software application to API Gateway 220. API Gateway 220 may receive the request to access the software application and relay the request to instruction generator 210.

Instruction generator 210 may generate a response to a request from client devices 260 to access the software application. Instruction generator 210 may generate a response that includes an indication of a configuration file. Instruction generator 210 may generate the response that includes either a configuration file including configuration information associated with a current version of the widget or a configuration file including configuration information associated with a new version of the widget. Instruction generator 210 may generate the response to specify multiple widgets used to deploy the requested software application. For example, instruction generator 210 may generate a response that includes configuration files associated with a plugin and one or more utility widgets used to deploy the requested software application.

A plugin may be a type of widget that includes data for a graphical user interface that outputs data associated with the one or more utility widgets underlying a software application. In some examples, a plugin may be a type of widget corresponding to a reference (e.g., uniform resource locator or URL) for a software application. A utility widget may be a type of widget that support functionality of a software application without including a frontend user interface.

Utility widgets may be shared by different software applications due to the ensured compatibility according to the techniques described herein. Plugins and utility widgets may be assigned to a domain (e.g., a web domain such as domain.net) that is managed by software repository 270. References to a software application, or widgets of the software application, may be uniform resource indicators (URLs) that append the domain managed by software repository 270. For example, a software application may be assigned a domain of domain.net. The software application may include a widget that includes a reference to append the domain assigned to the software application, such as a reference of "/widget" that appends the domain to be "domain.net/widget."

In accordance with the techniques of the disclosure, declarative expectation module 212 may determine a declarative expectation mapped to each widget specified in a configuration file. For example, in response to a developer providing a declaration expectation for widget, declarative expectation module 212 may store the declarative expectation in storage devices 204 and associate the stored declarative expectation with an identifier for the widget. In this example declarative expectation module 212 may determine the declarative expectation for a specific widget by searching storage devices 204 with an identifier for the specific widget.

Instruction generator 210, via API gateway 220, may receive, from shell interface 262A, a request to execute a software application for managing an electronic document. In this example, the software application is configured to execute using at least a first widget and a second widget. Instruction generator 210 may generate instructions for executing the software application at client device 260A. For example, instruction generator 210 may cause configuration file generator 208 to generate a configuration file for providing the software application at client device 260A. For instance, the configuration file may indicate a first widget and a second widget. In this example, instruction generator 210 may cause declarative expectation module 212 to provide the declarative expectation for child widgets. For instance, instruction generator 210 may cause declarative expectation module 212 to provide the declarative expectation for the second widget. In this example, instruction generator 210 may, with API gateway 220, output the instructions to client device 260A. Management controller 202 may output a configuration file to client device 260A. Management controller 202 may output the declarative expectation as part of the configuration file or separately from the configuration file (e.g., in another file or by outputting a fetch request).

Shell interface 262A, when executed by processing circuitry of client device 260A, may receive configuration information and instructions. Shell interface 262A may use the configuration information to request software code files associated with the software application from software repository 270. Software repository 270 may fetch the requested software code files (e.g., widget(s)) and send the files to shell interface 262A. Shell interface 262A may receive the software code files and execute the widgets (e.g., at least a first widget and a second widget).

For example, the instructions many be configured to cause shell interface 262A, when executed by processing circuitry of client device 260A, to generate contextual information for the first widget. The instructions may further cause client device 260A to determine whether the contextual information satisfies a declarative expectation for the second widget. The first widget may be a host to the second widget. The first widget may not be a child or may be a child widget to another widget.

In response to a determination that the contextual information satisfies the declarative expectation for the second widget, the instructions may cause client device 260A to run the second widget using (e.g., ingesting) the contextual information. In response, however, to a determination that the contextual information does not satisfy the declarative expectation for the second widget, the instructions may cause client device 260A to output a notification indicating that the contextual information does not satisfy the declarative expectation. Computing system 200 may forward an indication of the notification to developer computing device 150. In this way, a developer of the first widget and/or the second widget may be notified that the contextual information generated by the first widget does not satisfy the declarative expectation for the second widget. In some examples, computing environment 20 may perform a self-healing process to correct the mismatch between the contextual information generated by the first widget and the declarative expectation for the second widget.

Client device 260A may itself perform a self-healing process. For example, consumer computing device 160 and/or computing system 100 may perform a lingual analysis. In some examples, client device 260A may work with self-healing module 226 to perform the self-healing process. For example, self-healing module 226 may use a machine learning model to self-heal. For example, in production environments, child widgets may release changes to its consuming widgets. Self-healing module 226 may attempt to call the Deconfliction Large Language Model (LLM). This service may leverage the LLM service to help consume the data passed by the parent widget. Self-healing module 226 may apply deconfliction logic and may attempt to map the keys between the data and data expected in the contract. For example, the LLM service may apply models to map deltas by looking at similarities between key names, values, data types etc.

Figure 3:
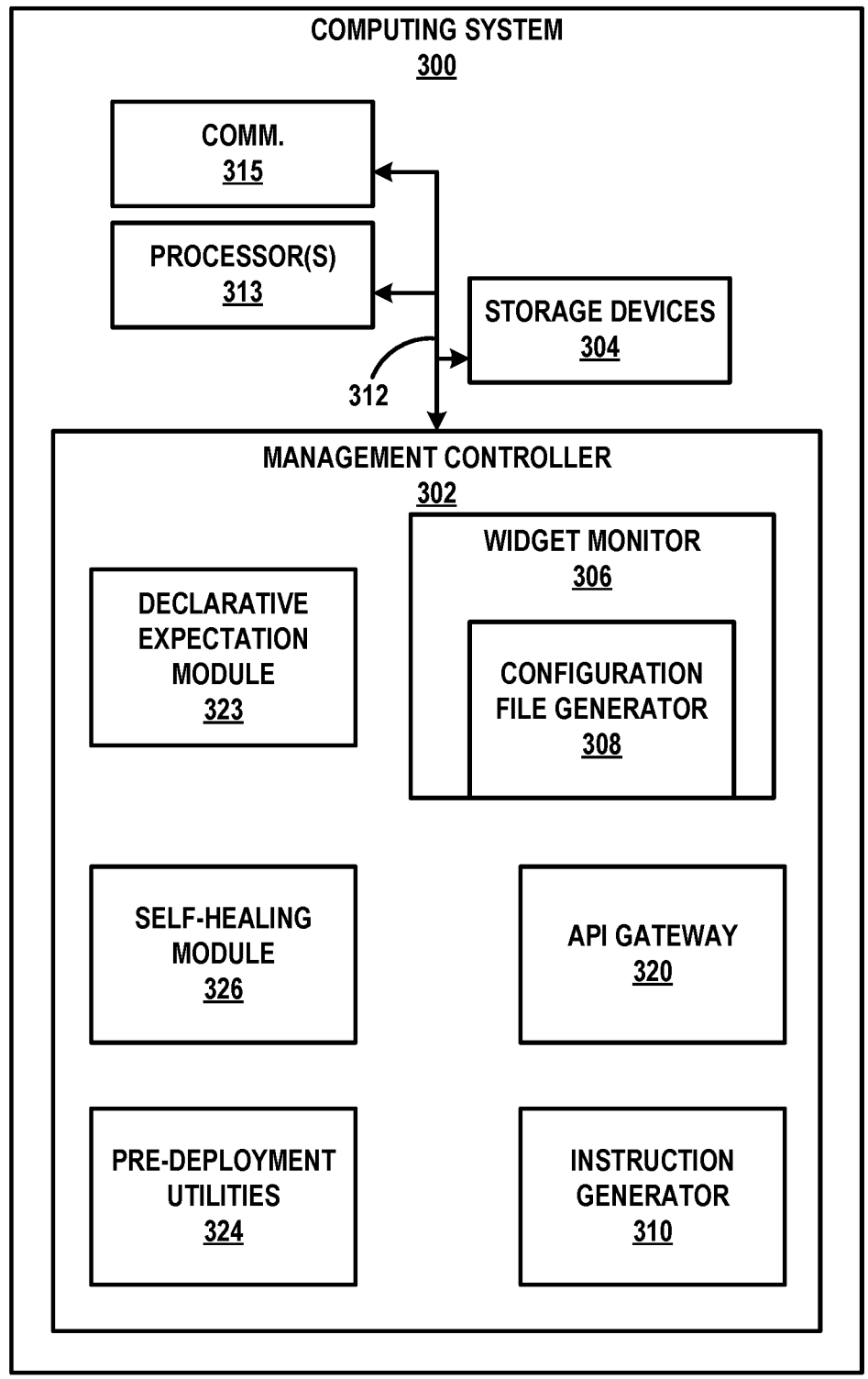
FIG. 3 is a block diagram illustrating an example computing system for managing software applications, in accordance with the techniques of this disclosure.

FIG. 3 is a block diagram illustrating example computing system 300 for managing software applications, in accordance with the techniques of this disclosure. Computing system 300 of FIG. 3 may be described as an example or alternate implementation of computing system 100 of FIG. 1 and/or computing system 200 of FIG. 2. One or more aspects of FIG. 3 may be described herein within the context of FIGS. 1 and 2 for example purposes only.

Computing system 300 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 300 represents a cloud computing system, server farm, and/or server cluster (or portion thereof) that provides services to other devices or systems. Computing system 300 may represent or be implemented through one or more virtualized computer instances (e.g., virtual machines, containers) of a cloud computing system, server farm, data center, and/or server cluster.

In the example of FIG. 3, computing system 300 may include one or more processors 313, one or more communication units 315, storage devices 304, and management controller 302. One or more of the devices, modules, storage areas, or other components of computing system 300 may be interconnected to allow for inter-component communications (e.g., physically, communicatively, and/or operatively). In some examples, such connectivity may be provided by communication channels (e.g., communication channels 312), which may represent one or more of a system bus, a network connection, an inter-process communication data structure, a cloud-based connection, or any other method for communicating data.

One or more communication units 315 of computing system 300 may communicate with devices external to computing system 300 by transmitting and/or receiving data, and may operate, in some respects, as both an input device and an output device. In some examples, communication units 315 may communicate with other devices over a network. In other examples, communication units 315 may send and/or receive radio signals on a radio network such as a cellular radio network. In other examples, communication units 315 of computing system 300 may transmit and/or receive satellite signals on a satellite network. Examples of communication units 315 include, but are not limited to, a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more processors 313 of computing system 300 may implement functionality and/or execute instructions associated with computing system 300 or associated with one or more modules illustrated herein and/or described below. One or more processors 313 may be, may be part of, and/or may include processing circuitry that performs operations in accordance with one or more aspects of the present disclosure. Examples of processors 313 include microprocessors, application processors, display controllers, auxiliary processors, one or more sensor hubs, and any other hardware configured to function as a processor, a processing unit, or a processing device. Computing system 300 may use one or more processors 313 to perform operations in accordance with one or more aspects of the present disclosure using software, hardware, firmware, or a mixture of hardware, software, and firmware residing in and/or executing at computing system 300.

One or more processors 313 (also referred to herein as "processors 313") may provide an operating environment or platform for various modules described herein, which may be implemented as software, but may in some examples include any combination of hardware, firmware, and software. One or more processors 313 may execute instructions of one or more modules. Processors 313 may retrieve, store, and/or execute the instructions and/or data of one or more applications, modules, or software. Processors 313 may also be operably coupled to one or more other software and/or hardware components, including, but not limited to, one or more of the components of computing system 300 and/or one or more devices or systems illustrated as being connected to computing system 300.

Processors 313 may implement functionality and/or execute instructions within computing system 300. For example, processors 313 may receive and execute instructions that provide the functionality of API Gateway 320, widget monitor 306, self-healing module 326, contextual utility 322, pre-deployment utilities 324, and instruction generator 310. These instructions executed by processors 313 may cause computing system 300 to store and/or modify information within storage devices 304 or processors 313 during program execution. Processors 313 may execute instructions of API Gateway 320, widget monitor 306, self-healing module 326, contextual utility 322, pre-deployment utilities 324, and instruction generator 310 to perform one or more operations. That is API Gateway 320, widget monitor 306, self-healing module 326, contextual utility 322, pre-deployment utilities 324, and instruction generator 310 may be operable by processors 313 to perform various functions described herein.

Storage devices 304 within computing system 300 may store information for processing during operation of computing system 300 (e.g., computing system 300 may store data accessed by API Gateway 320, widget monitor 306, self-healing module 326, contextual utility 322, pre-deployment utilities 324, declarative expectation module 323 and instruction generator 310 during execution at computing system 300). In some examples, storage devices 304 may include temporary memory, meaning that a primary purpose of storage devices 304 are not long-term storage. Storage devices 304 of computing system 300 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 304 may include one or more computer-readable storage media, which may include, for example, memories or cloud-based storage components. Storage devices 304 may be configured to store larger amounts of information than volatile memory. Storage devices 304 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 304 may store program instructions and/or information associated with API Gateway 320, widget monitor 306, self-healing module 326, contextual utility 322, pre-deployment utilities 324, and instruction generator 310.

Storage devices 304 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support the computing system 300. Storage devices 304 may be distributed across multiple devices or servers within a cloud computing environment provided by computing system 200.

Management controller 302 may include API Gateway 320, widget monitor 306, contextual utility 322, pre-deployment utilities 324, self-healing module 326, and instruction generator 310. API Gateway 320 may be an API management tool that interfaces between computing devices and software repository 170 of FIG. 2. API Gateway 320 may act as an external server that forwards requests to access a software application (e.g., reverse proxy) to accept all API calls made by client devices. In this way, API Gateway 320 may allow computing system 300 to manage software applications by acting as an interface for client devices to request the appropriate components of a software application from a software repository or content delivery network.

Computing system 300 may maintain configuration files that include configuration information for various versions of widgets. Computing system 300 may intelligently regulate which version of widgets are sent to particular requests by sending appropriate configuration files associated with configuration information for particular versions of widgets.

Widget monitor 306 may retrieve configuration information for a software application. Widget monitor 306 may receive configuration information specifying multiple widgets for deploying the software application. Widget monitor 306 may retrieve the configuration information via API Gateway 320.

In the example of FIG. 3, widget monitor 306 may include configuration file generator 308. In some instances, configuration file generator 308 may generate one or more configuration files based on configuration information retrieved from widget monitor 306. Widget monitor 306 may send the instructions to configuration file generator 308 to generate configuration files responsive to widget monitor 306 detecting a new version of a widget used to execute the software application has been uploaded. Configuration file generator 308 may generate a configuration file that includes the retrieved configuration information.

In some examples, widget monitor 306 may send instructions to configuration file generator 308 to generate a pre-deployment configuration file. Configuration file generator 308 may generate a pre-deployment configuration file based on a newly uploaded widget that has not been tested for quality assurance and security compliance. Pre-deployment utilities 324 may manage pre-deployment configuration files. Pre-deployment utilities 324 may also provide software utilities (SDKs, APIS, etc.) to software administrators to run quality assurance and security tests on a newly uploaded widget. For example, pre-deployment utilities 324 may provide tools for software administrators to assign a health score to a newly uploaded widget.

API Gateway 320 of management controller 302 may receive a request to execute a software application. In some instances, API Gateway 320 may obtain a request to execute a software application for managing an electronic document. Instruction generator 310 may prepare a response to the request to execute the software application. Instruction generator 310 may compile necessary configuration files for widgets used to execute the requested software application. Instruction generator 310 may obtain the necessary configuration files from the configuration files stored in storage devices 304.

In accordance with the techniques of the disclosure, declarative expectation module 323 may determine a declarative expectation mapped to each widget specified in a configuration file. For example, in response to a developer may providing a declaration expectation for widget, declarative expectation module 323 may store the declarative expectation in storage devices 323 and associate the stored declarative expectation with an identifier for the widget. In this example declarative expectation module 323 may determine the declarative expectation for a specific widget by searching storage devices 304 with an identifier for the specific widget.

Declarative expectation module 323 may generate the declarative expectation to specify one or more variables (e.g., labels or keys). In some examples, declarative expectation module 323 may generate the declarative expectation to specify a data format (e.g., alphanumeric or "ddd-ddd-dddd").

Instruction generator 310 may include instructions generated by instruction generator 310 in a response to a request for a software application. Instruction generator 310 may generate instructions for loading widgets and data used to execute a software application. Instruction generator 310 may generate instructions to load widgets used to execute a software application and to provide a declarative expectation for each widget.

In some examples, management controller 302 may apply self-healing to help to match data output by a host widget to a declarative expectation for a child widget configured to ingest the data output by the host widget. For example, instruction generator 310 may generate the instructions to cause a client device to map a label for data of the contextual information that satisfies a similarity threshold to a label for the declarative expectation. For instance, instruction generator 310 may generate the instructions to cause a client device to apply (e.g., client device itself or client device with self-healing module 326) lingual analysis to translate labels between the contextual information sent from a host widget and the declarative expectation such that the child widget can render successfully instead of failing the entire experience. In some instances, instruction generator 310 may generate the instructions to cause a client device to match (e.g., client device itself or client device with self-healing module 326) a data format (e.g., ddd-ddd-dddd matching "555-555-5555") to translate labels between the contextual information sent from a host widget and the declarative expectation such that the child widget can render successfully instead of failing the entire experience.

Self-healing module 326 may use a machine learning model to self-heal. For example, in production environments, child widgets may release changes to its consuming widgets. Self-healing module 326 may attempt to call the Deconfliction Large Language Model (LLM). This service may leverage the LLM service to help consume the data passed by the parent widget. Self-healing module 326 may apply deconfliction logic and may attempt to map the keys between the data and data expected in the contract. For example, the LLM service may apply models to map deltas by looking at similarities between key names, values, data types etc. In this way, self-healing module 326 may cause the client device to generate modified contextual data that satisfies a declarative expectation. The following pseudo-code provides an example self-healing process.

```
passed
{
documentId: 123XYZ
}
expected
{
docId: alphaNumeric
}
Based on lingual analysis: The key names 'documentId'
    and 'docId' appear to be similes and will be
mapped together by the deconfliction adapter layer.
passed
{
phone: 842-075-1824
}
expected
{
recoveryNo: ddd-ddd-dddd}
```

Based on lingual analysis: The values are the in a compatible type format and will be mapped together by the deconfliction adapter layer.

Instruction generator 310 may generate the instructions to cause the client device to report to computing system 300 the result of a comparison of the contextual data with a declarative expectation. For example, instruction generator 310 may generate the instructions to cause the client device to output, based on a determination that the contextual information does not satisfy the declarative expectation for the second widget, a notification to the system. The notification may indicate, for example, that the contextual information does not satisfy the declarative expectation for the second widget. In some examples, instruction generator 310 may generate the instructions to cause the client device to report to computing system 300 the result of a self-healing process. For example, instruction generator 310 may generate the instructions to cause the client device to output, based on a determination that the contextual information does not satisfy the declarative expectation for the second widget and that the modified contextual information satisfies the declarative expectation, a notification to the system, the notification indicating that the contextual information does not satisfy the declarative expectation for the second widget and that the client device successfully corrected the violation.

Figure 4:
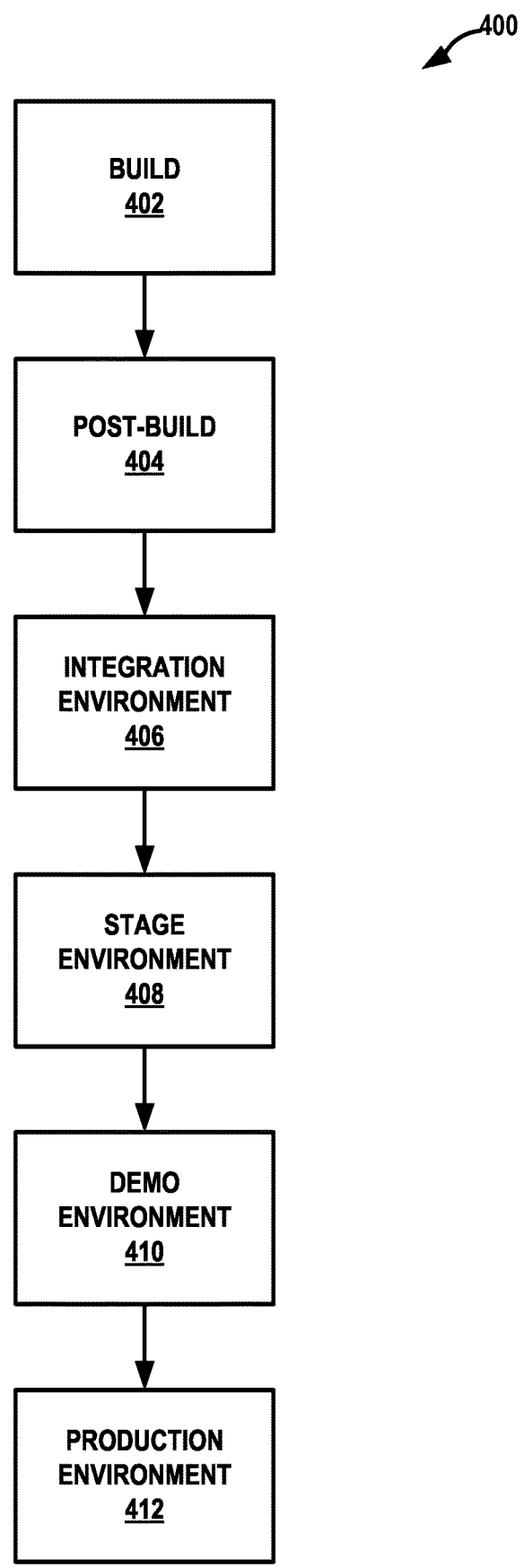
FIG. 4 is a conceptual diagram illustrating an example deployment lifecycle of a new version of a widget for a software application, in accordance with techniques of this disclosure.

FIG. 4 is a conceptual diagram illustrating an example deployment lifecycle 400 of a new version of a widget for a software application, in accordance with techniques of this disclosure. Deployment lifecycle 400 may include multiple, discrete environments associated with different stages in the deployment of a new version of a widget. In the example of FIG. 4, deployment lifecycle 400 may include build environment 402, post-build environment 404, integration environment 406, stage environment 408, demo environment 410, and production environment 412. One or more aspects of FIG. 4 may be described herein within the context of FIGS. 1-3 for example purposes only.

Build environment 402 may include a user of developer computing device 150 creating executable software code files for a new version of a widget used in implementing software applications. Build environment 402 may include the manual generation of executable programs by software developers using command line interface 152, for example. Post-build environment 404 may include developer computing device 150 executing software code files of a new version of a widget created in build environment 402. Post-build environment 404 may include a software developer locally testing a new version of a widget using command line interface 152. Integration environment 406 may include developer computing device 150 uploading a new version of a widget to software repository 170. In some instances, integration environment 406 may include computing system 100 determining whether the new version of the widget uploaded to software repository 170 was wrapped via a standardized format. In some examples, integration environment 406 may include quality assurance and/or security testing.

Stage environment 408 may include internal testing of the new version of the widget. Stage environment 408 may include software development teams mimicking behavior of consumer computing devices 260A-260N on the software developers' computing devices. In some instances, stage environment 408 may include performance testing. Stage environment 408 may include computing system 100 obtaining metrics from software developers executing the new version of the widget in various software application with consumer computing devices 260A-260N. Computing system 100 may obtain metrics such as Demo environment 410 may include external testing and/or demonstration of a new version of a widget. Demo environment 410 may include software development teams deploying a new version of a software application to consumer computing devices 260A-260N, where consumer computing devices 260 are operated by clients of the software development team. Demo environment 410 may include only deploying a new version of widget to consumer computing devices 260 associated with a select group of clients with pre-determined access to the new version of the widget.

Production environment 412 may include the deployment of a new version of a widget to the general public and/or to subscribers with access to the widget. Production environment 412 may be the final stage of the deployment of the new version of the widget. Production environment 412 may include receiving requests for a software application implementing the widget, sending configuration information and instructions to execute the requested software application, and accessing the software application by executing widgets implemented in the software application based on received configuration information and instructions. In some instances, production environment 412 may include strict deployment configuration thresholds to determine whether the new version of the widget is being executed according to quality assurance and/or security standards associated with a consumer-ready software application.

In accordance with aspects of this disclosure, techniques may permit unlimited freedom for teams to update widgets instead of using architecture to enforce. For example, new product versions will not be updated until another group can test the data. The system may not permit posting of a widget in stage environment 408, demo environment 410, and production environment 412 unless declarative expectation is provided. In accordance with aspects of this disclosure, using a declarative expectation and then running them in real time may help minimize or eliminate errors in the processing system. When the computing system loads a widget, a contract may be inspected. The computing system may analyze data sent from host widget and compare against the data the child widget is expecting to ensure the validity of the contract is still intact. The system may be further improved when using self-healing in the production environment 412, where time to repair errors is critical.

Figure 5:
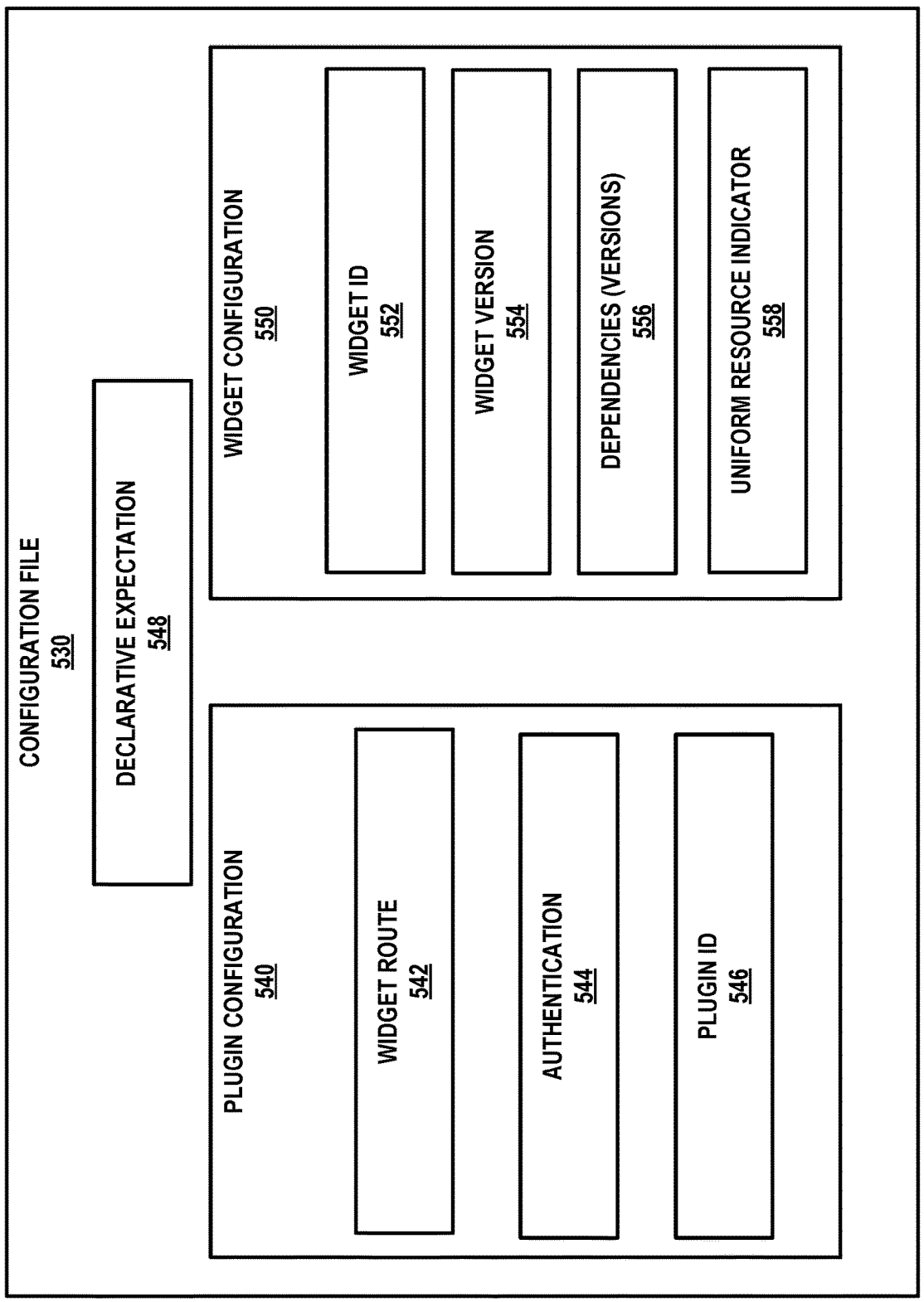
FIG. 5 is a conceptual diagram illustrating an example configuration file, in accordance with the techniques of this disclosure.

FIG. 5 is a conceptual diagram illustrating an example configuration file 530, in accordance with the techniques of this disclosure. FIG. 5 is discussed with FIGS. 1-4 for example purposes only. In some instances, configuration file generator 308 of FIG. 3 may generate configuration file 530. Configuration file generator 308 may generate configuration file 530 in response to, for example, widget monitor 306 detecting a new widget for a software application or a new version of a widget for the software application.

In the example of FIG. 5, configuration file 530 may include configuration information for a software application uploaded to software repository 170 of FIG. 1. For example, configuration file 530 may include plugin configuration 540, declarative expectation 548, and widget configuration 550.

Declarative expectation 548 may define one or more of a key name, a value, or a data type. For example, declarative expectation 548 may specify a key name "docID." In this example, computing environment 10, or more specifically, for example, computing system 100, may cause a client device to compare a key name specified in declarative expectation 548 with a key name indicated in contextual information. In another example, declarative expectation 548 may specify a data type as value type (e.g., "alpha numeric") and/or a format (e.g., "ddd-ddd-dddd"). In this example, computing environment 10, or more specifically, for example, computing system 100, may cause a client device to compare a data type specified in declarative expectation 548 with a data type indicated in contextual information.

Plugin configuration 540 may include configuration information corresponding to a plugin associated with a software application. A plugin may be a type of widget that includes data for a graphical user interface that outputs data associated with one or more utility widgets underlying a software application. In some instances, a plugin may be a type of widget corresponding to a reference (e.g., uniform resource locator or URL) for a software application. Widget configuration 550 may include configuration information corresponding to a utility underlying functionality of the software application associated with configuration file 530. A utility widget may include a type of widget that support functionality of a software application without including a frontend user interface (e.g., a user interface). Utility widgets may be shared by different development teams due to, for example, the ensured compatibility according to the techniques described herein. Plugins and/or utility widgets may be assigned to a domain (e.g., a web domain such as domain-.net) that is managed by software repository 170. References to a software application, or widgets of the software application, may be uniform resource indicators (URLs) that append the domain managed by software repository 170. For example, a software application may be assigned a domain of domain.net. The software application may include a widget that includes a reference to append the domain assigned to the software application, such as a reference of "/widget" that appends the domain to be "domain.net/widget."

Plugin configuration 540 may include configuration information of a plugin for a software application associated with configuration file 530. Plugin configuration 540 may include configuration information, such as widget route 542, authentication 544, and plugin identification (plugin ID) 546. An example of plugin configuration 540 is as follows:

```
{
  "route": "/home",
  "authenticated": }
    "type": "SSO",
    "clientId": "XYZ123"
  },
  "pluginID": "@home-team/app"
}
```

Plugin ID 546 may include configuration information specifying a reference to the plugin providing the user interface for the software application associated with configuration file 530. For example, plugin ID 546 may include a uniform resource indicator (e.g., uniform resource locator or URL) for the plugin associated with the software application. Plugin ID 546 may include the configuration information used by a requesting computing device to load the plugin for the software application associated with configuration file 530. Plugin ID 546 may include instructions for a requesting computing device to pull the plug in associated with plugin ID 546 from a software repository (e.g., software repository 170 of FIG. 1).

Authentication 544 may include configuration information indicating whether a requesting computing device has the appropriate credentials to access the software application associated with configuration file 530. In some instances, management controller 102 of FIG. 1, for example, may provide instructions to a requesting computing device to input credentials to access the software application. Management controller 102 may receive the inputted credentials from the requesting computing device. Management controller 102 may verify whether the inputted credentials match credentials with access to the software application associated with configuration file 530. Authentication 544 may include configuration information associated with whether the inputted credentials have been verified. In some examples, authentication 544 may include a Boolean value indicating that a requesting computing device has provided the verified credentials to access the software application associated with configuration file 530.

Widget route 542 may include configuration information associated with references to utility widgets that include software code for processes that execute the software application associated with configuration file 530. Widget route 542 may be associated with a particular domain hosting the software application (e.g., domain.net). In some examples, widget route 542 may include uniform resource indicators (URLs) associated with each utility widget used to execute the software application. Widget route 542 may include a URL appending the domain hosting the software application (e.g., /widget). Widget route 542 may include a complete URL (e.g., uniform resource locator) to a utility widget associated with widget configuration 550, such as "domain-.net/widget."

Widget configuration 550 may include configuration information, such as widget identification (widget ID) 552, version 554, one or more dependencies 556 (also referred to herein as simply "dependencies 556"), and uniform resource indicator (URL) 558. An example of widget configuration 550 is as follows:

```
{
  "widgetID": "@prepare PDF/app",
  "version": "2.0.6"
  "metadata": {
    "dependsOn": ["@PDF viewer/app"]
    "URLs": ["preload.html", "/api/me"]
  }
}
```

Widget ID 552 may be a tag or identifier for a utility widget associated with widget configuration 550. For example, widget ID 552 may be a tag assigned to the build artifact of the utility widget that was uploaded to a software repository (e.g., software repository 170 of FIG. 1). Version 554 may include configuration information associated with a version of the utility widget used to execute the software application associated with configuration file 530. In some examples, configuration file generator 308 of FIG. 3 may define version 554 based on whether configuration file 530 is a pre-deployment configuration file or a deployment configuration file. In examples where configuration file 530 is a pre-deployment configuration file, configuration file generator 308 may define version 554 based on a version of the utility widget that is undergoing pre-deployment testing (e.g., quality assurance and/or security testing). In examples where configuration file 530 is a deployment configuration file, configuration file generator 308 may define version 554 as a version of the utility widget that has satisfied quality assurance and security requirements.

Dependencies 556 may include configuration information identifying metadata specifying which, if any, utility widgets the utility widget associated with widget configuration 550 depends on. For example, widget configuration 550 may be associated with a utility widget that depends on another utility widget. In this example, dependencies 556 may include metadata identifying a reference to dependency widgets, as well as, optionally, a version of the dependency widgets that the parent widget applies to execute processes of the software application associated with configuration file 530. In some examples, computing system 100 may generate a separate configuration file in response to a new version of a dependency widget defined in dependencies 566 being uploaded. Dependencies 556 may include a uniform resource indicator (e.g., uniform resource locator) associated with the version of the dependency widget the parent widget applies in execution of the software application. In some examples, widget configuration 550 may not include dependencies 556 if the widget associated with widget configuration 550 does not depend on any other widgets.

URL 558 may include configuration information on how to access the utility widget associated with widget configuration 550 from a software repository (e.g., software repository 170 of FIG. 1). In some instances, URL 558 may represent the URL specified in widget route 542 of plugin configuration 540. URL 558 may also represent the URL included in a widget configuration for another utility widget that depends on the widget associated with widget configuration 550. In some examples, URL 558 may represent a website URL (e.g., "domain.net/plugin/widget") that may be used by a consumer computing device to load the plugin and embedded widget associated with widget configuration 550 from a content delivery network or software repository. URL 558 provides utility widget specific configuration information that allows software developers and consumers to access a particular version of a software application from a content delivery network based on a version specified in version 554. In this way, the common knowledge base platform as described herein (e.g., computing system 100 of FIG. 1) may regulate deployment of various versions of software by intelligently sending configuration files specifying appropriate versions of widgets based on a requesting computing device. Computing system 100 may send a software developer computing device a pre-deployment configuration file that specifies untested versions of utility widgets for a requested software application, while sending consumer computing devices a deployment configuration file that specifies tested, stable versions of utility widgets for the requested software application.

In the example of FIG. 5, configuration file 530, or more specifically, for example, widget configuration 550, may specify a first widget (e.g., "@prepare PDF/app") configured to prepare an electronic document for execution by a signer. In this example, the first widget may be owned by a first developer team. Configuration file 530, or more specifically, for example, widget configuration 550, may specify a second widget (e.g., @PDF viewer/app) for presenting the electronic document to the signor. In this example, the second widget may be owned by a second developer team. In accordance with the techniques of the disclosure, computing environment 10 may permit the first developer team to make changes to the first widget without approval from the second developer team and, similarly, permit the second developer team to make changes to the second widget without approval from the first developer team. Moreover, computing system 100 may generate one or more instructions to cause a client device to determine whether contextual information for a first widget (e.g., a host widget) satisfies (e.g., matches) a declarative expectation 548 for the second widget (e.g., a child widget). In this way, computing environment 10 may help to reduce or even eliminate errors from changes to between widgets.

Figure 6:
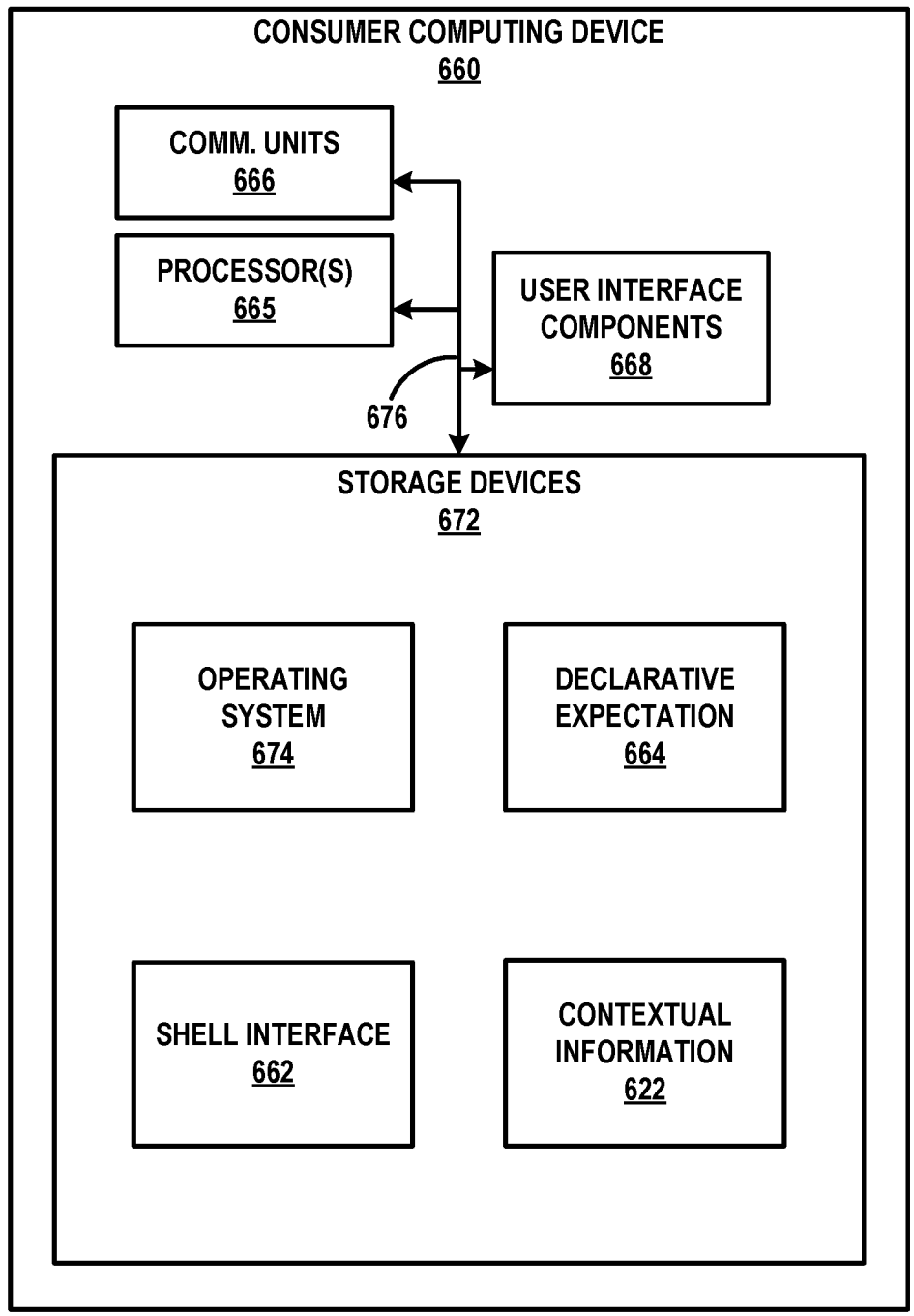
FIG. 6 is a block diagram illustrating an example consumer computing device, in accordance with the techniques of this disclosure.

FIG. 6 is a block diagram illustrating an example consumer computing device 660, in accordance with the techniques of this disclosure. FIG. 6 is discussed with FIGS. 1-5 for example purposes only. Consumer computing device 660 may be an example of consumer computing device 160 of FIG. 1 or any of consumer computing devices 260 of FIG. 2. FIG. 6 illustrates only one particular example of consumer computing device 660, and many other examples of consumer computing device 660 may be used in other instances and may include a subset of components included in example consumer computing device 660 or may include additional components not shown in FIG. 6.

In the example of FIG. 6, consumer computing device 660 may include processors 665, communication units 666, user interface (UI) components 668, and one or more storage devices 672 (also referred to herein as simply "storage devices 672"). Communication channels 676 ("COMM channel 676") may interconnect each of the processors 665, communication units 666, user interface (UI) 668, storage device 672 and declarative expectation 622 for inter-component communications (physically, communicatively, and/or operatively). In some examples, communication channel 676 may include a system bus, a network connection, an inter-process communication data structure, or any other method for communicating data.

In some examples, UI components 668 may be a presence-sensitive display configured to detect input (e.g., touch and non-touch input) from a user of consumer computing device 660. UI components 668 may output information to a user in the form of a UI, which may be associated with functionality provided by consumer computing device 660. Such UIs may be associated with computing platforms, operating systems, applications, and/or services executing at or accessible from consumer computing device 660 (e.g., electronic message applications, chat applications, Internet browser applications, mobile or desktop operating systems, social media applications, electronic games, menus, and other types of applications).

Processors 665 may implement functionality and/or execute instructions within consumer computing device 660. For example, processors 665 may receive and execute instructions that provide the functionality of shell interface 662 and operating system (OS) 674. These instructions executed by processors 665 may cause consumer computing device 660 to store and/or modify information within storage devices 672 or processors 665 during program execution. Processors 665 may execute instructions of shell interface 662 and OS 674 to perform one or more operations. That is shell interface 662 and OS 674 may be operable by processors 665 to perform various functions described herein.

In the example of FIG. 6, communication units 666 of consumer computing device 660 may communicate with one or more external devices via one or more wired and/or wireless networks by transmitting and/or receiving network signals on the one or more networks. Examples of communication units 666 include a network interface card (e.g., such as an Ethernet card), an optical transceiver, a radio frequency transceiver, a GNSS receiver, or any other type of device that can send and/or receive information. Other examples of communication units 666 may include short wave radios, cellular data radios (for terrestrial and/or satellite cellular networks), wireless network radios, as well as universal serial bus (USB) controllers.

In the example of FIG. 6, storage devices 672 may include operating system (OS) 674 and shell interface 662. Storage devices 672 within consumer computing device 660 may store information for processing during operation of consumer computing device 660 (e.g., consumer computing device 660 may store data accessed by shell interface 662 and OS 674 during execution at consumer computing device 660). In some examples, storage devices 672 may be a temporary memory, meaning that a primary purpose of storage devices 672 is not long-term storage. Storage devices 672 on consumer computing device 660 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 672 may include one or more computer-readable storage media. Storage devices 672 may be configured to store larger amounts of information than volatile memory. Storage devices 672 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 672 may store program instructions and/or information associated with shell interface 662 and OS 674.

Storage devices 672 may include OS 674. OS 674 may control the operation of components of consumer computing device 660. For example, OS 674 may facilitate the communication of shell interface 662 with processors 665, storage devices 672, and communication units 666. In some examples, OS 674 may manage interactions between software applications and a user of consumer computing device 660. OS 674 may have a kernel that facilitates interactions with underlying hardware of consumer computing device 660 and provides a fully formed application space capable of executing a wide variety of software applications having secure partitions in which each of the software applications executes to perform various operations. In some examples, UI components 668 may be considered a component of OS 674.

Storage devices 672 may include shell interface 662. Shell interface 662 may include a website browser interface. In some instances, shell interface 662 may be a website browser application. Shell interface 662 may include instructions on how to request software applications from computing system 100. In some examples, shell interface 662 may include instructions on how to execute a software application requested from computing system 100.

In the example of FIG. 6, shell interface 662 may process a widget to generate contextual information 622. For example, processors 665, when executing shell interface 662, may execute a host widget to generate contextual information 622 and store the contention information at storage devices 672. In this example, processors 665, when executing shell interface 662, may determine whether contextual information 622 satisfies declarative expectation 664.

In accordance with the techniques described herein, consumer computing device 660 may execute a software application for managing electronic documents. For example, shell interface 662 of computing device 660 may send a request (e.g., an HTML request) to computing system 100 to access a software application implemented with multiple widgets. Shell interface 662 may send a request to computing system 100 for access to a software application with communication units 666. Communication units 666 may receive a response generated by computing system 100 that includes configuration information associated with widgets implemented in the software application, as well as instructions to execute the software application. Communication units 666 may relay the response generated by computing system 100 to shell interface 662 via communication channels 676. Shell interface 662 may generate contextual information for a first widget using the instructions. In this example, the configuration information received includes a declarative expectation 664 for a second widget. Shell interface 662 may determine whether contextual information 622 satisfies declarative expectation 664 for the second widget. In response to a determination that contextual information 622 satisfies declarative expectation 664 for the second widget, shell interface 662 may execute the second widget with the contextual information.

In response, however, to a determination that contextual information 622 does not satisfy declarative expectation 664 for the second widget, shell interface 662 may output an alert and/or notification indicating that the contextual information 622 does not satisfy declarative expectation 664 for the second widget, for example, to computing system 100. In some examples, shell interface 662 may perform a self-healing process in response to the determination that contextual information 622 does not satisfy declarative expectation 664 for the second widget. For example, shell interface 662 may itself or with another system (e.g., computing system 100) generate modified contextual information. In response to a determination that the self-healing process is successful, shell interface 662 may execute the second widget with the modified contextual information.

Figure 7:
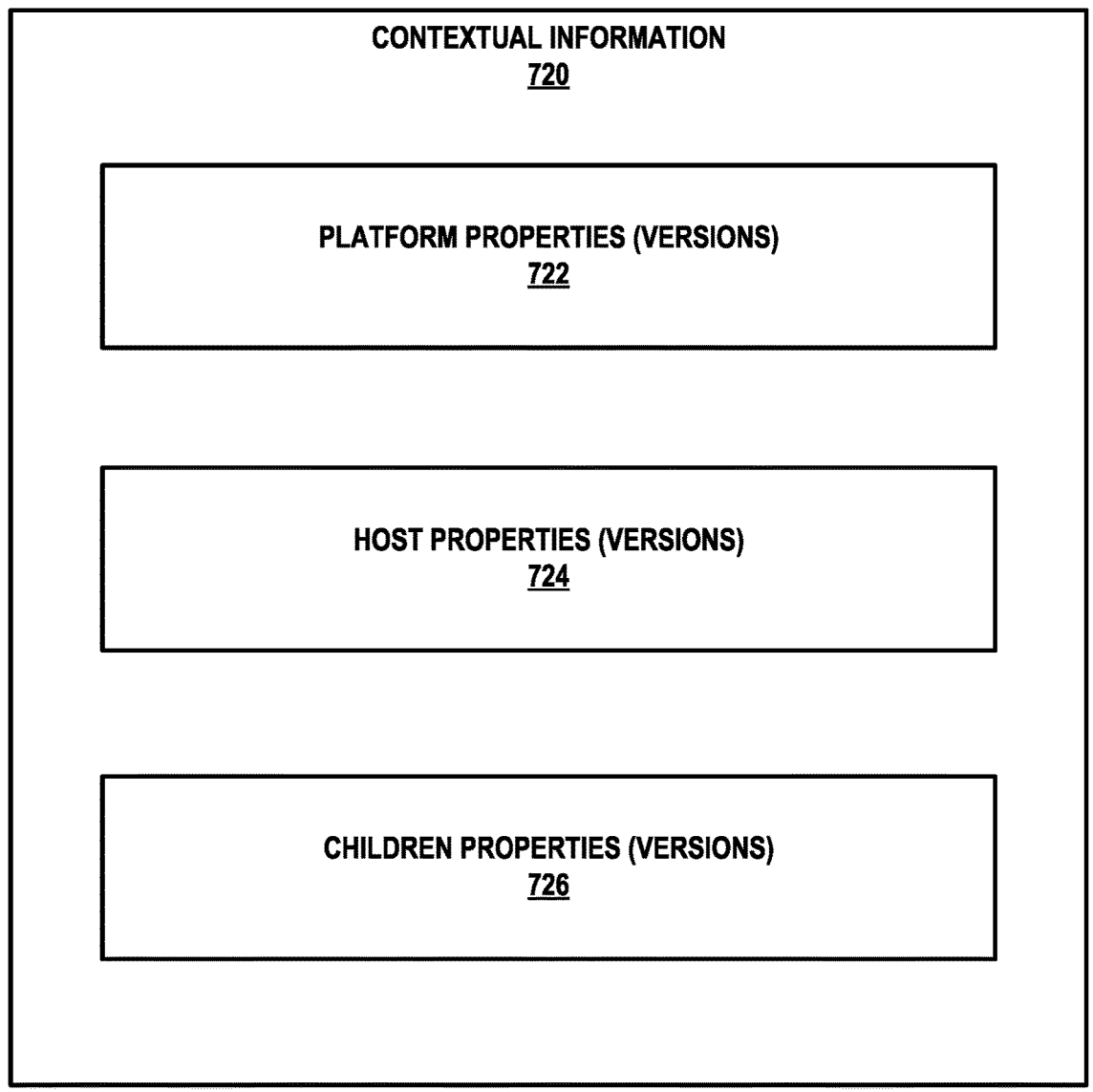
FIG. 7 is a conceptual diagram illustrating example contextual information to load a software application, in accordance with the techniques of this disclosure.

FIG. 7 is a conceptual diagram illustrating example contextual information 720 for loading a software application, in accordance with the techniques of this disclosure. FIG. 7 is discussed with reference to FIGS. 1-6 for example purposes only. In some instances, contextual information 720 may be generated by command line interface 152 of developer computing device 150 and/or shell interface 162 of consumer computing device 160, of FIG. 1. Shell interface 162, for example, may generate contextual information 720 responsive to instructions from computing system 100 of FIG. 1. Shell interface 162 may generate contextual information 720 based on received configuration information associated with a requested software application. For example, shell interface 162 may generate contextual information 720 based on a received configuration file (e.g., configuration file 530 of FIG. 5) associated with a requested software application. Shell interface 162 may generate contextual information 720 based on plugin configuration 540, for example. Shell interface 162 may generate contextual information 720 based on a utility provided by the common knowledge base platform (e.g., contextual utility 322 of FIG. 3).

In the example of FIG. 7, contextual information 720 may organize instructions to load widgets and data for a software application into domain properties. Contextual information 720 may include domain properties corresponding to a dependency hierarchy of a software application. For example, contextual information 720 may include platform properties 722, host properties 724, and children properties 726.

Platform properties 722 may include, for example, a deployment environment (e.g., demo environment 410 or production environment 412 of FIG. 4) the common knowledge base platform (e.g., computing system 100 of FIG. 1) may send configuration information to, a browser with a command line interface (e.g., shell interface 162 of FIG. 1)

to access and execute the software application, data of a user account associated with the requesting computing device, an authentication state of the requesting computing device, a language preference of a user operating the requesting computing device, font information for presenting an electronic document, a runtime widget hierarchy, and utilities provided by the common knowledge base platform. In some examples, platform properties 722 may be generated based on plugin configuration information 540 of FIG. 5. In some examples, shell interface 162 may alter the platform data included in platform properties 722. For example, shell interface 162 may specify font information (e.g., size of font, color of font, etc.) for presenting an electronic document.

Host properties 724 may include information associated with feature flags included in the host widget, a configuration API of the host widget, data used to execute the host widget, and dependent functions the host widget uses. For example, host properties 724 may include host data that specifies a utility widget that includes processes for the software application. Host properties 724 may include information for shell interface 162 to load the utility widget, even before a user operating consumer computing device 160 executes the processes of the widget.

Host properties 724 may include host data associated with dependent functions the host widget uses. Host properties 724 may include information generated based on dependencies 556 of widget configuration 550, indicating where to access versions of utility widget a host widget depends on Host properties 724 may be generated based on host data such as metadata specifying a host widget (e.g., plugin). In some instances, a host widget may be a plugin that exposes an API for other widgets to apply in processes for the software application. Host properties 724 may allow the other widgets to use the API exposed by the host widget by including configuration, bootstrapping, and initialization information of the API.

Children properties 726 may include children data associated with a host widget using a child widget as a wrapper or a high order component (HOC). Children properties 726 may be generated based on widget configuration 550 of FIG. 5. For example, children properties 726 may be generated to include instructions based on contextual information associated with dependent functions the host widget uses. Children properties 726 may include information generated based on dependencies 556 of widget configuration 550, indicating where to access versions of utility widget a host widget depends on.

Figure 8:
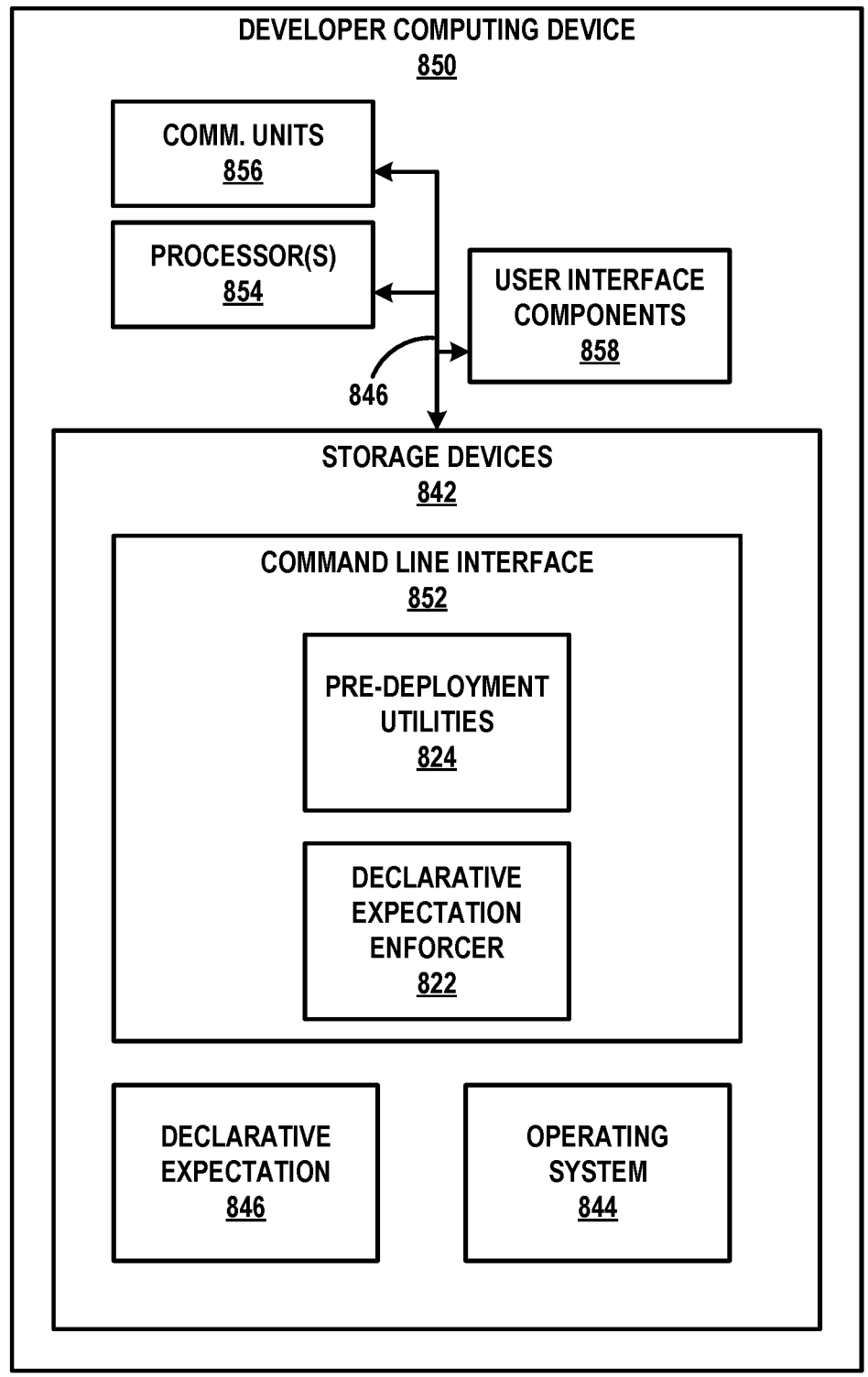
FIG. 8 is a block diagram illustrating an example developer computing device, in accordance with the techniques of this disclosure.

FIG. 8 is a block diagram illustrating an example developer computing device 850, in accordance with the techniques of this disclosure. FIG. 8 is discussed with reference to FIGS. 1-7 for example purposes only. Developer computing device 850 may be an example of developer computing device 150 of FIG. 1. FIG. 8 illustrates only one particular example of developer computing device 850, and many other examples of developer computing device 850 may be used in other instances and may include a subset of components included in example developer computing device 850 or may include additional components not shown in FIG. 8.

In the example of FIG. 8, developer computing device 850 may include processors 854, communication units 856, user interface (UI) components 858, and storage devices 842. Communication channels 846 ("COMM channel 846") may interconnect each of the components processors 854, communication units 856, UI components 858, and storage devices 842 for inter-component communications (physically, communicatively, and/or operatively). In some examples, communication channel 846 may include a system bus, a network connection, an inter-process communication data structure, or any other method for communicating data.

UI components 858 may be a presence-sensitive display configured to detect input (e.g., touch and non-touch input) from a user of developer computing device 850. UI components 858 may output information to a user in the form of a UI, which may be associated with functionality provided by developer computing device 850. Such UIs may be associated with computing platforms, operating systems, applications, and/or services executing at or accessible from developer computing device 850 (e.g., electronic message applications, chat applications, Internet browser applications, mobile or desktop operating systems, social media applications, electronic games, menus, and other types of applications).

Processors 854 may implement functionality and/or execute instructions within developer computing device 850. For example, processors 854 may receive and execute instructions that provide the functionality of command line interface 852 and operating system (OS) 844. These instructions executed by processors 854 may cause developer computing device 850 to store and/or modify information within storage devices 842 or processors 854 during program execution. Processors 854 may execute instructions of command line interface 852 and OS 844 to perform one or more operations. That is storage devices 852 and OS 844 may be operable by processors 854 to perform various functions described herein.

In the example of FIG. 8 storage devices 843 may communicate with one or more external devices via one or more wired and/or wireless networks by transmitting and/or receiving network signals on the one or more networks. Examples of, communication units 856 include a network interface card (e.g., such as an Ethernet card), an optical transceiver, a radio frequency transceiver, a GNSS receiver, or any other type of device that can send and/or receive information. Other examples of communication units 856 may include, for example, short wave radios, cellular data radios (for terrestrial and/or satellite cellular networks), wireless network radios, as well as universal serial bus (USB) controllers.

In the example of FIG. 6, storage devices 842 may include operating system (OS) 844 and command line interface 852. Storage devices 842 within developer computing device 850 may store information for processing during operation of developer computing device 850 (e.g., developer computing device 850 may store data accessed by command line interface 852 and OS 844 during execution at developer computing device 850). In some examples, storage devices 842 may be a temporary memory, meaning that a primary purpose of storage devices 842 is not long-term storage. Storage devices 842 on developer computing device 850 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 842 may include one or more computer-readable storage media. Storage devices 842 may be configured to store larger amounts of information than volatile memory. Storage devices 842 may further be configured for long-term storage of information as non-volatile memory space and retain information after power on/off cycles.

Examples of non-volatile memories include magnetic hard discs, optical discs, floppy discs, flash memories, or forms of electrically programmable memories (EPROM) or electrically erasable and programmable (EEPROM) memories. Storage devices 842 may store program instructions and/or information associated with command line interface 852 and OS 844.

Storage devices 842 may include OS 844. OS 844 may control the operation of components of developer computing device 850. For example, OS 844 may facilitate the communication of command line interface 852 with processors 854, storage devices 442, and communication units 856. In some examples, OS 844 may manage interactions between software applications and a user of developer computing device 850. OS 844 may have a kernel that facilitates interactions with underlying hardware of developer computing device 850 and provides a fully formed application space capable of executing a wide variety of software applications having secure partitions in which each of the software applications executes to perform various operations. In some examples, UI components 858 may be considered a component of OS 844.

Storage devices 842 may include command line interface 852. Command line interface 852 may include a shell interface, a software development kit, an application programming interface, or any other interface a software developer can use to create and execute software code. In the example of FIG. 8, command line interface 852 may include pre-deployment utilities 824 and declarative expectation enforcer 622. Declarative expectation enforcer 622 may prompt the developer to provide declarative expectation 846 for each widget. In some examples, declarative expectation enforcer 622 may not post a widget (e.g., to a software repository) without declarative expectation 846 for the widget.

Command line interface 852 may upload a new version of a widget to software repository 170. Pre-deployment utilities 824 may include instructions received from computing system 100. Pre-deployment utilities 824 of command line interface 852 may output an option to a user, via UI components 858, to input deployment configuration associated with thresholds representing required performance metrics associated with a particular environment (e.g., demo environment 410 or production environment 412 of FIG. 4). Pre-deployment utilities 824 may include instructions for quality assurance and/or security testing command line interface 852 may perform on new developed widgets.

Figure 9A:
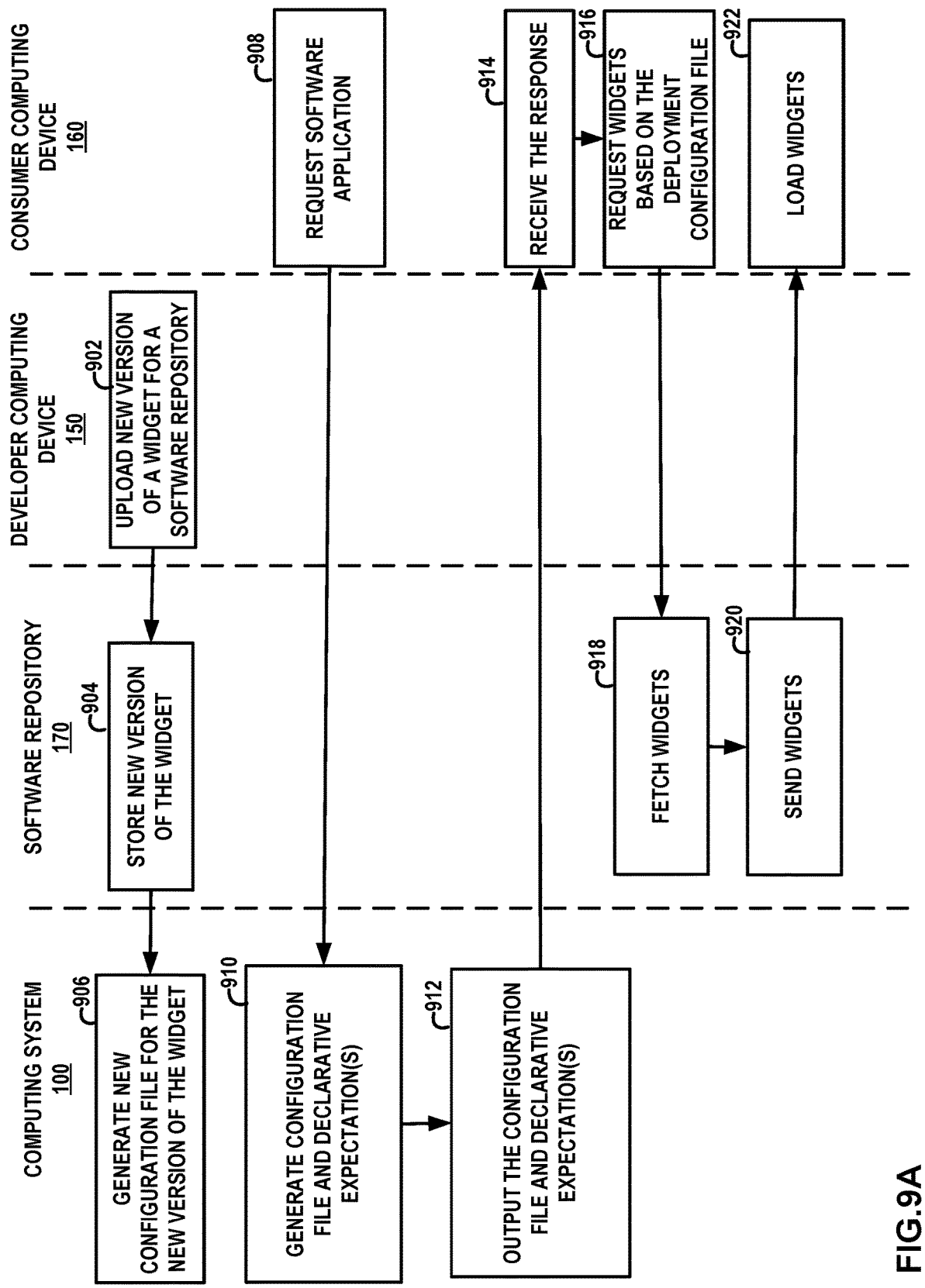
FIG. 9A is a flow chart illustrating an example process for using a declarative expectation, in accordance with the techniques of this disclosure.

FIG. 9A is a flow chart illustrating an example process for using a declarative expectation, in accordance with the techniques of this disclosure. FIG. 9A is discussed with FIGS. 1-8 for example purposes only. In the example of FIG. 9A, computing system 100, software repository 170, developer computing device 150, and consumer computing device 160 may correspond to computing system 100, software repository 170, developer computing device 150 and consumer computing device 160 of FIG. 1.

Developer computing device 150 may upload a new version of a widget for a software application to software repository 170 (902). Developer computing device 150 may upload a new version of the widget in demo environment 410 or production environment 412 of FIG. 4. Developer computing device 150 may upload a new version of a widget that was tested using pre-deployment utilities provided by computing system 100. Developer computing device 150 may upload a new version of the widget for the software application to software repository 170 in response to the new version of the widget satisfying pre-deployment testing requirements. Developer computing device 150 may upload the new version of the widget with a command line interface (e.g., command line interface 152). In some instances, command line interface 152 may upload the new version of the widget using a utility provided by computing system 100. Command line interface 152 may use the utility to upload a build artifact that converts a new version of the widget into a standardized format. Command line interface 152 may send the build artifact of the new version of the widget to software repository 170 via network 101. Software repository 170 may store the new version of the widget for the software application (904). Software repository 170 may accordingly store the build artifact of the new version of the widget to help to ensure that all software applications stored on software repository 170 are compatible.

Computing system 100 may generate a configuration file for the new version of the widget for the software application (906). In some instances, management controller 302 may retrieve the configuration information for the new version of the widget. For example, widget monitor 306 of management controller 302 may continuously poll software repository 170 for new versions of the widget. In response to widget monitor 306 detecting software repository 170 has stored the new version of the widget, widget monitor 306 may retrieve the configuration information associated with the new version of the widget. In some examples, configuration file generator 308 may generate a deployment configuration file associated with the software application that includes the new version of the widget. Configuration file generator 308 may generate a deployment configuration file such as configuration file 530 of FIG. 5. Configuration file generator 308 may include configuration information associated with the new version of the widget as part of widget configuration 550. In some examples, the new version of the widget may be specified in dependencies 556 of widget configuration 550.

In the example of FIG. 9A, consumer computing device 160 may request access to a software application (908). Consumer computing device 160 may request access to the software application using shell interface 162. Consumer computing device 160 may be a consumer computing device requesting access to the software application to manage electronic documents. Computing system 100 may receive the request to access the software application. Computing system may receive the request to access the software application with API Gateway 220. Computing system 100, or more specifically instruction generator 210, may generate configuration file and one or more declarative expectation (910). In some instances, instruction generator 210 may include a preliminary threshold to determine whether the new version of the widget is compatible with the ecosystem provided by computing system 100. Instruction generator 210 may determine whether protocols and/or libraries applied in the new version of the widget are consistent with other protocols and/or libraries applied in other widgets managed by computing system 100. For example, computing system 100 may support React 17, but the new version of the widget applies React 18. Instruction generator 210 may detect the discrepancy of the version of React applied and issue a warning to developer computing device 150 to alter the new version of the widget to be compatible with the ecosystem supported by computing system 100.

Computing system 100 may output the configuration file and declarative expectation(s) (912). Computing system 100 may generate the response to the request that includes the deployment configuration file (e.g., configuration file 530 of FIG. 5) for the software application and a declarative expectation for each widget or child widget. Computing system 100 may generate the response to the request that includes instructions to execute the software application.

Computing system 100 may send the response to consumer computing device 160 using API Gateway 220, for example. Consumer computing device 160 may receive the response with the deployment configuration file and the one or more declarative expectations (914). Consumer computing device 160 may receive the response with shell interface 162.

Consumer computing device 160, or more particularly shell interface 162, may request widgets for the software application based on the deployment configuration file and a declarative expectations (916). Consumer computing device 160 may send the request to software repository 170 via network 101, for example. Consumer computing device 160 may send a request to fetch widgets based on reference indications (URLs or URLs) included in the configuration file. Software repository 170 may fetch the widgets based on the request sent from consumer computing device 160 (918). Software repository 170 may fetch the widgets for the software application based on the reference indications included in the request sent by consumer computing device 160. Software repository 170 may send consumer computing device 160 the widgets for the software application (920). Software repository 170 may send the widgets to consumer computing device 160 via network 101. Consumer computing device 160 may load the received widgets (922). Consumer computing device 160 may load and execute the received widgets according to the instructions received from computing system 100. The instructions may cause consumer computing device 160 to determine whether the contextual information satisfies a declarative expectation for the second widget, for example, as discussed in FIG. 9B.

Figure 9B:
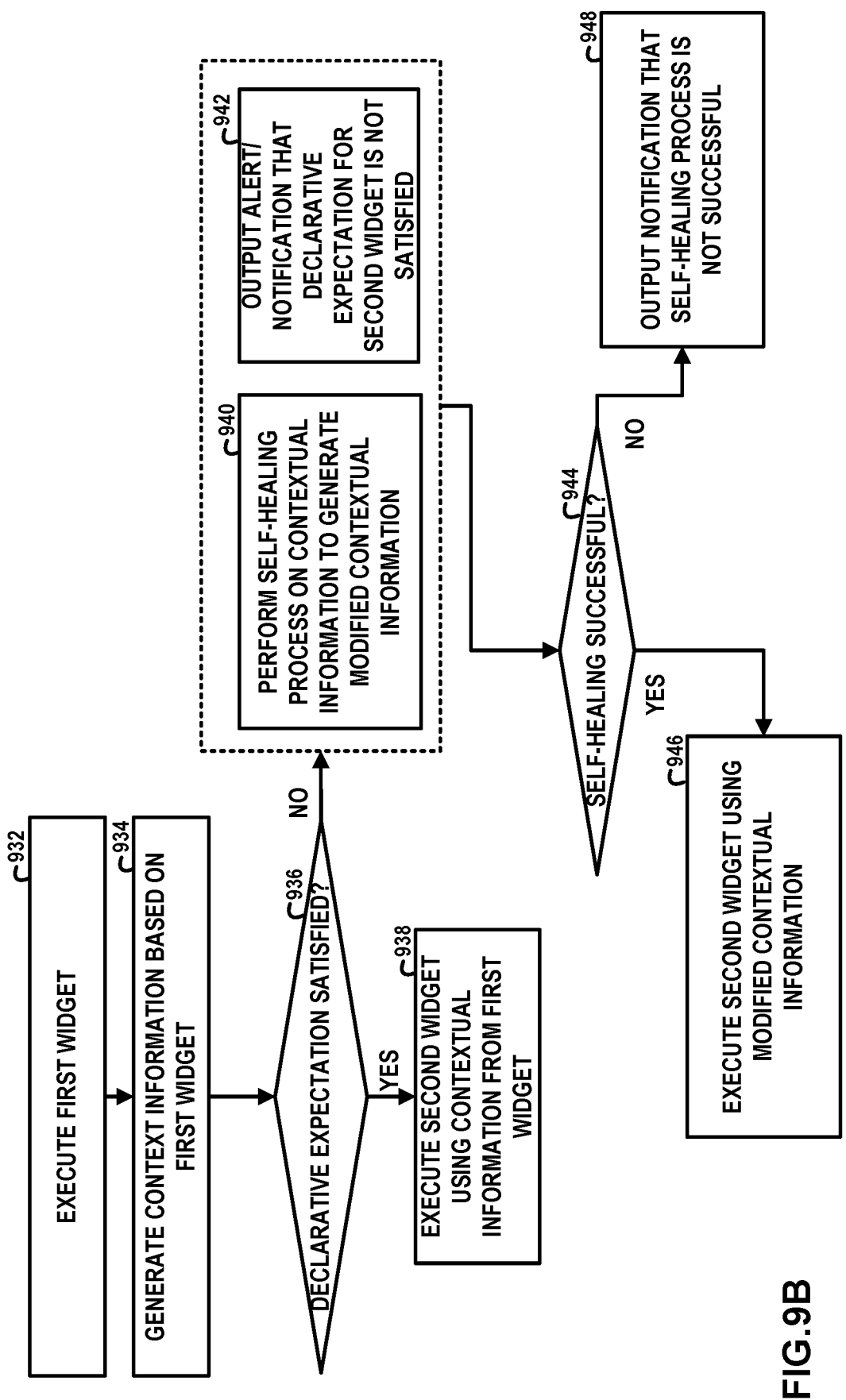
FIG. 9B is a flow chart illustrating an example process for loading widgets using a declarative expectation, in accordance with the techniques of this disclosure.

FIG. 9B is a flow chart illustrating an example process for loading widgets using a declarative expectation, in accordance with the techniques of this disclosure. FIG. 9B is discussed with FIGS. 1-8, 9A for example purposes only. In the example of FIG. 9B, a client device (e.g., consumer computing device 160, client device 260A, or client device 660) may execute a first widget (932). For example, the client device may execute a host widget specified by configuration information. In this example, the client device may generate contextual information based on the first widget (934). For example, the client device, when executing code of the first widget, may generate the contextual information.

The client device, when executing the instructions provided by computing system 100, may determine whether the contextual information satisfies a declarative expectation for the second widget (936). In response to determining that the contextual information satisfies the declarative expectation for the second widget ("YES" of 936), the client device may execute the second widget using the contextual information form the first widget (938). In response, however, to determining that the contextual information satisfies the declarative expectation for the second widget ("NO" of 936), the client device may output an alert and/or notification that the declarative expectation for the second widget is not satisfied (942). For example, the client device may output an alert and/or notification indicating one or more of the first widget, the second widget, the contextual information generated by the first widget, the declarative expectation or the second widget, or information associated with why the contextual information does not satisfy the declarative expectation for the second widget. In this example, computing system 100 may output the alert and/or notification to a developer computing devices associated with the first widget and/or to a developer computing devices associated with the second widget.

In response to determining that the contextual information satisfies the declarative expectation for the second widget ("NO" of 936), the client device may perform a self-healing process on the contextual information to generate modified contextual information (940). In response to determining that the self-healing process is successful ("YES" of 944), the client device may execute the second widget using the modified contextual information (946). In response, however, to determining that the self-healing process is not successful ("NO" of 944), the client device may output a notification that the self-healing process is not successful (948).

Figure 10:
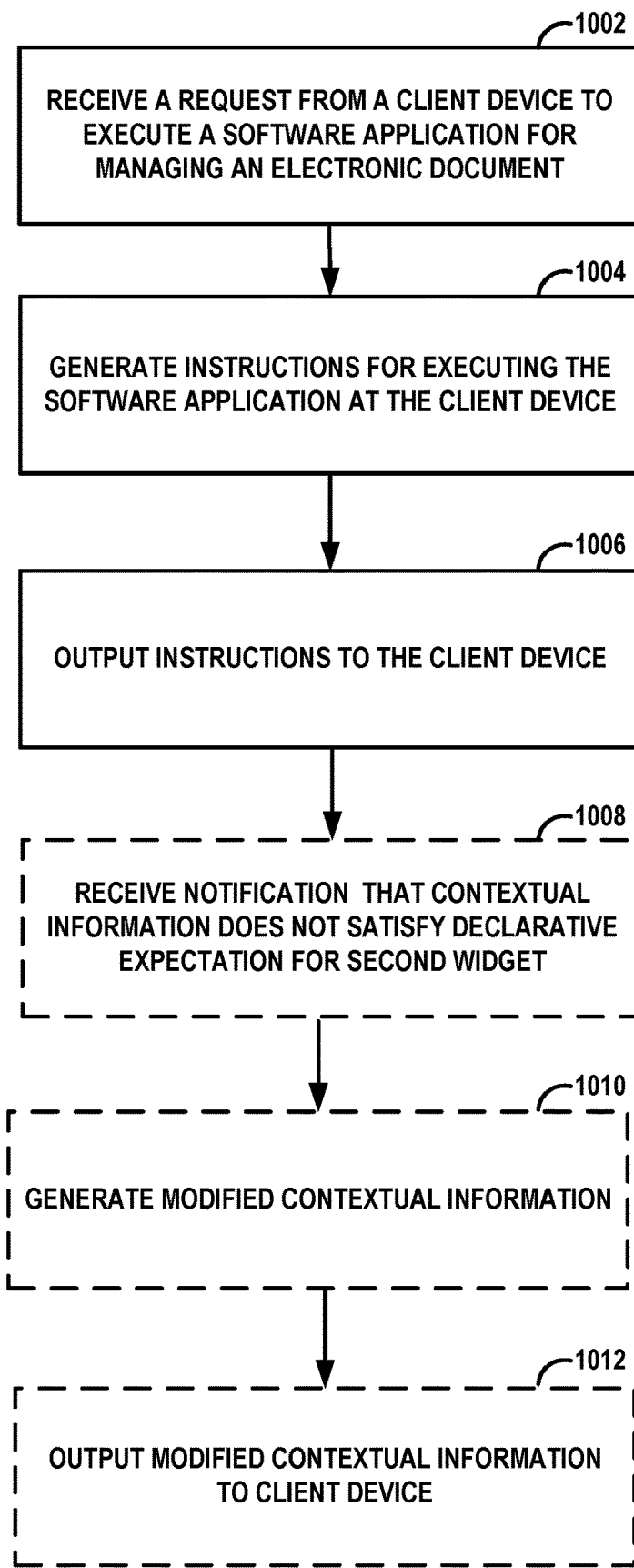
FIG. 10 is a flow chart illustrating a process for executing a software application for managing an electronic document, in accordance with techniques of this disclosure.

FIG. 10 is a flow chart illustrating an example process for executing a software application for managing an electronic document, in accordance with techniques of this disclosure. FIG. 10 is discussed with FIGS. 1-8, 9A. 9B for example purposes only.

In the example of FIG. 10, computing system 100 may receive a request from a client device to execute a software application for managing an electronic document (1002). For example, computing system 100 may receive an HTML request from a client device (e.g., consumer computing device 160, client device 260A, or client device 660) requesting a software application to execute an electronic document. Computing system 100 may generate instructions for executing the software application at the client device (1004). For example, computing system 100 may generate instructions to cause the client device to fetch a first widget and second widget from software repository 170. In this example, the instructions cause the client device to execute the first widget, which generates contextual information for ingestion by the second widget. The instructions may cause the client device to determine whether the contextual information generated by the first widget satisfies a declarative expectation for the second widget. In some examples, the instructions may cause the client device to output an alert and/or notification when the contextual information generated by the first widget satisfies a declarative expectation for the second widget. The instructions may cause the client device to perform a self-healing operation when the contextual information generated by the first widget satisfies the declarative expectation for the second widget.

Computing system 100 may output instructions (1006). For example, computing system 100 may output the instructions, a configuration file, and one or more declarative expectations for each child widget indicated in the configuration file. For example, the instructions may cause a client device (e.g., consumer computing device 160, client device 260A, or client device 660) to execute a first widget, which generates contextual information. In this example, the instructions may cause the client device to determine whether the contextual information satisfies a declarative expectation for the second widget. The instructions may cause the client device to, in response to a determination that the contextual information satisfies the declarative expectation for the second widget, execute the second widget using the contextual information. For instance, the instructions may be configured to cause the client device to load, based on a determination that the contextual information satisfies the declarative expectation for the second widget, the contextual information when executing the second widget.

In response to a determination that the contextual information does not satisfy a declarative expectation for the second widget, the instructions may cause the client device to output a notification that the contextual information does not satisfy the declarative expectation. In this example, computing system 100 may receive the notification that the contextual information does not satisfy the declarative expectation (1008). In some examples, computing system 100 may output the notification to a developer computing device.

In some examples, the instructions may cause a client device (e.g., consumer computing device 160, client device 260A, or client device 660) to perform a self-healing process. For example, the instructions may cause the client device to output a request to computing system 100 to generate modified contextual information. In this example, computing system 100 may generate the modified contextual information (1010). For example, computing system 100 may apply lingual analysis to the contextual information generated by the client device executing the first widget with the declarative expectation for the second widget to match one or more labels. Computing system 100 may then output the modified contextual information to the client device (1012). In this example, the client device may execute the second widget with the modified contextual information to successfully render, for example, a browser view.

Figure 11A:
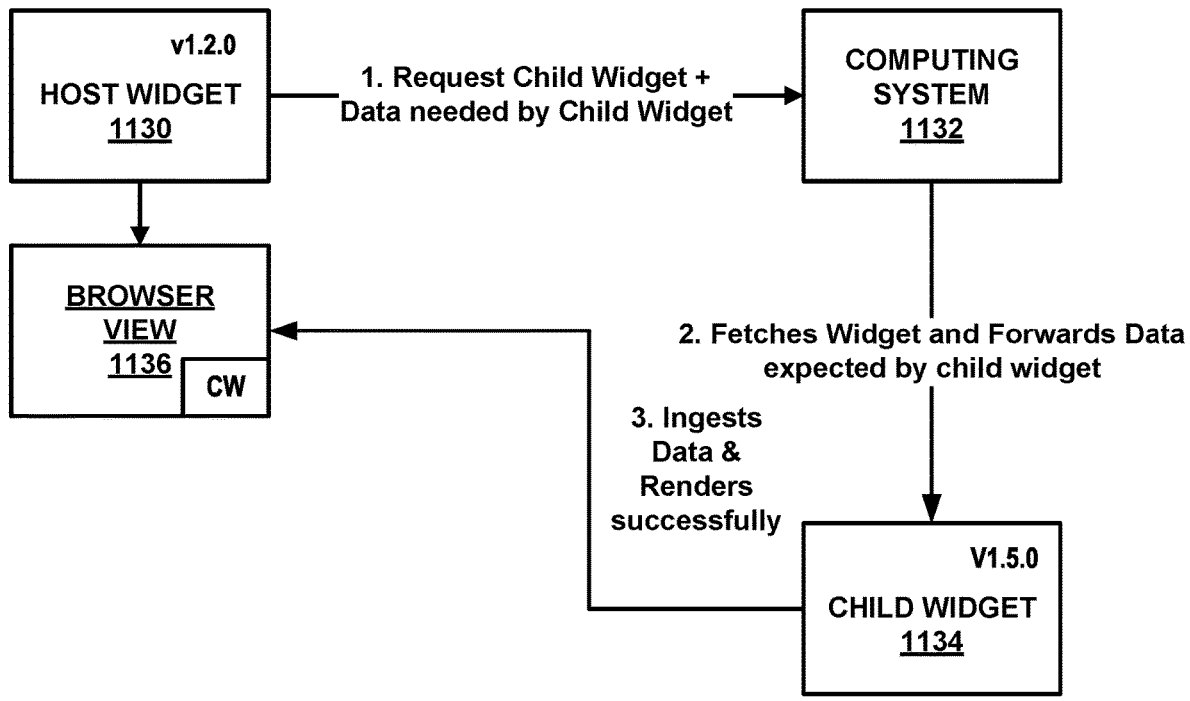
FIG. 11A is a conceptual diagram illustrating example widget contract application programming interface validation that renders successfully, in accordance with the techniques of this disclosure.

FIG. 11A is a conceptual diagram illustrating example widget contract application programming interface validation that renders successfully, in accordance with the techniques of this disclosure. FIG. 11A is discussed with FIGS. 1-8, 9A. 9B, 10 for example purposes only. In the example of FIG. 11A, a host widget 1130 may use an experience provided by a child widget 1134. Child widget 1134 may use contextual information from host widget 1130 to render the expected experience. However, host widget 1130 and child widget 1134 may release dynamically without dependencies on each other or communication. As such, a de-sync in the contextual information generated by host widget 1130 and/or the expected data for ingestion by child widget 1134 can be detrimental to the computing process performed by computing system 1132. In some examples, child widget 1134 may not be allowed to release new version without standardized contracts (e.g., declarative expectations) in place.

In the example of FIG. 11A, a client device (e.g., consumer computing device 160, client device 260A, or client device 660) may request, with computing system 1132, child widget 1134 and declarative expectations for child widget 1134. For example, the client device may request a software application for computing system 1132. The client device may fetch, with computing system 1132, host widget 1130 and child widget 1134. For example, computing system 1132 provides instructions, configuration information identifying host widget 1130 and child widget 1134, and the declarative expectation for child widget 1134. The instructions may cause the client device to fetch host widget 1130 and child widget 1134 from a software repository. In the example of FIG. 11A, host widget 1130, when executed by the client device, generates contextual information. In this example, the client devices determines that the contextual information generated by host widget 1130 satisfies (e.g., matches) the declarative expectation for child widget 1134. Child widget 1134 ingests the contextual information and successfully renders in browser view 1136. In example of FIG. 11A, host widget 1130 and child widget 1134 remains the same and no new versions are released by development teams.

Figure 11B:
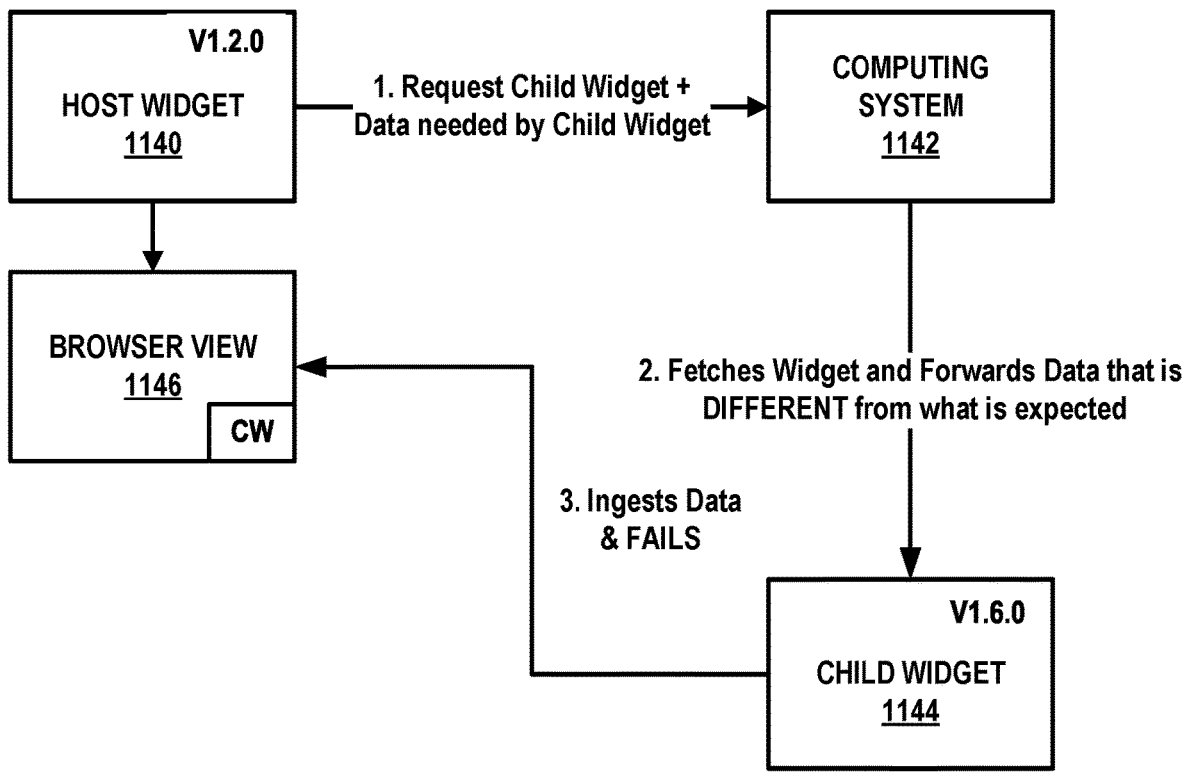
FIG. 11B is a conceptual diagram illustrating example widget contract application programming interface validation with an updated child widget that renders unsuccessfully, in accordance with the techniques of this disclosure.

FIG. 11B is a conceptual diagram illustrating example widget contract application programming interface validation with an updated child widget that renders unsuccessfully, in accordance with the techniques of this disclosure. FIG. 11B is discussed with FIGS. 1-8, 9A. 9B, 10, 11A for example purposes only. In the example of FIG. 11B, a developer may update child widget 1144 to be a different version (e.g., V.1.6.0) then one tested by developers of host widget 1140. For example, child widget 1144 may have changed a label for data from "DocID" to "DocumentId."

Similar to FIG. 11A, host widget 1140 may request, when executed by a client device (e.g., consumer computing device 160, client device 260A, or client device 660) and with computing system 1132, child widget 1144 and declarative expectations for child widget 1144. For example, the client device may request a software application for computing system 1142. The client device may fetch, with computing system 1142, host widget 1140 and child widget 1144. For example, computing system 1142 provides instructions, configuration information identifying host widget 1140 and child widget 1144, and the declarative expectation for child widget 1144. The instructions may cause the client device to fetch host widget 1140 and child widget 1144 from a software repository. In the example of FIG. 11B, host widget 1140, when executed by the client device, generates contextual information. In this example, the change to child widget 1144 results in the ingestion of the contextual information causing a failure in the rendering of in browser view 1146. For example, child widget 1144 may not correctly identify a document ID due to a change of a label for data from "DocID" to "DocumentId."

Figure 11C:
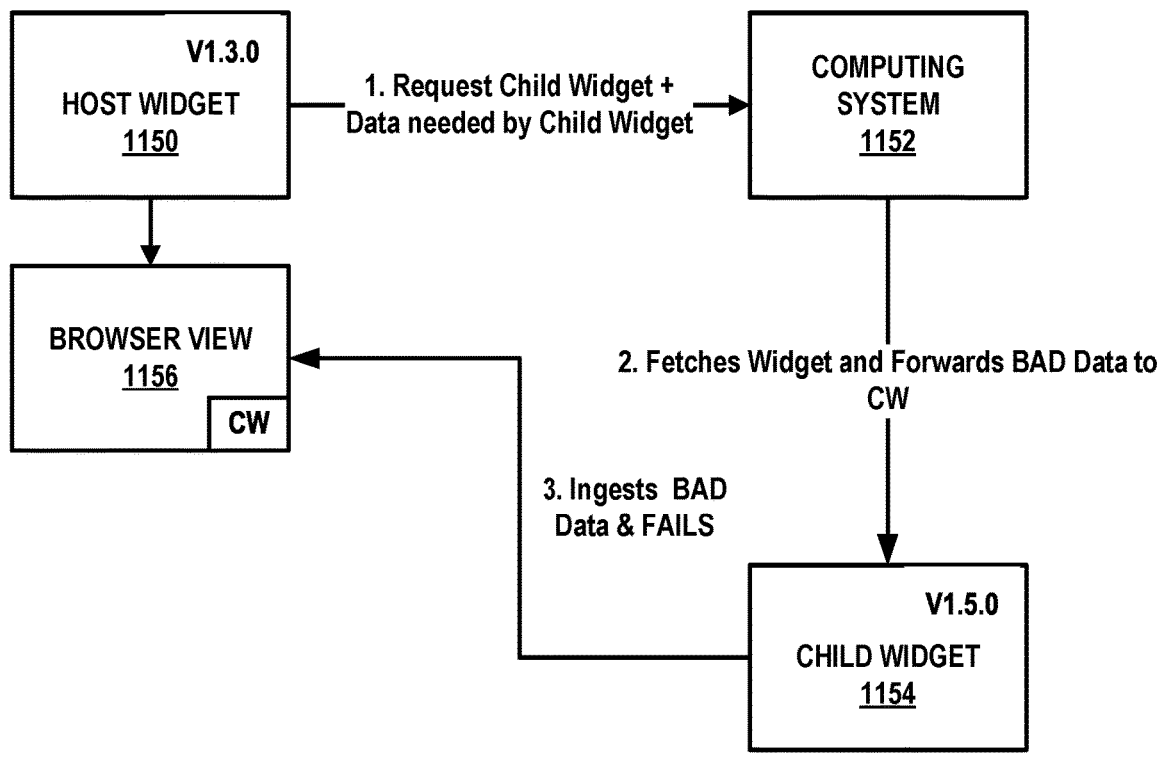
FIG. 11C is a conceptual diagram illustrating example widget contract application programming interface validation with an updated host widget that renders unsuccessfully, in accordance with the techniques of this disclosure.

FIG. 11C is a conceptual diagram illustrating example widget contract application programming interface validation with an updated host widget that renders unsuccessfully, in accordance with the techniques of this disclosure. FIG. 11C is discussed with FIGS. 1-8, 9A. 9B, 10, 11A, 11B for example purposes only. In the example of FIG. 11C, a developer may update host widget 1150 to be a different version (e.g., V.1.3.0) then one tested by developers of child widget 1154. For example, host widget 1150 may have changed a label for data from "DocID" to "DocumentId."

Similar to FIG. 11A, host widget 1150 may request, when executed by a client device (e.g., consumer computing device 160, client device 260A, or client device 660) and with computing system 1132, child widget 1154 and declarative expectations for child widget 1154. For example, the client device may request a software application for computing system 1152. The client device may fetch, with computing system 1152, host widget 1150 and child widget 1154. For example, computing system 1152 provides instructions, configuration information identifying host widget 1150 and child widget 1154, and the declarative expectation for child widget 1154. The instructions may cause the client device to fetch host widget 1150 and child widget 1154 from a software repository. In the example of FIG. 11C, host widget 1150, when executed by the client device, generates contextual information. In this example, the change to host widget 1150 results in the ingestion of the contextual information causing a failure in the rendering in in browser view 1156. For example, child widget 1154 may not correctly identify a document ID due to a change of a label in the contextual data for data from "DocID" to "DocumentId."

Figure 11D:
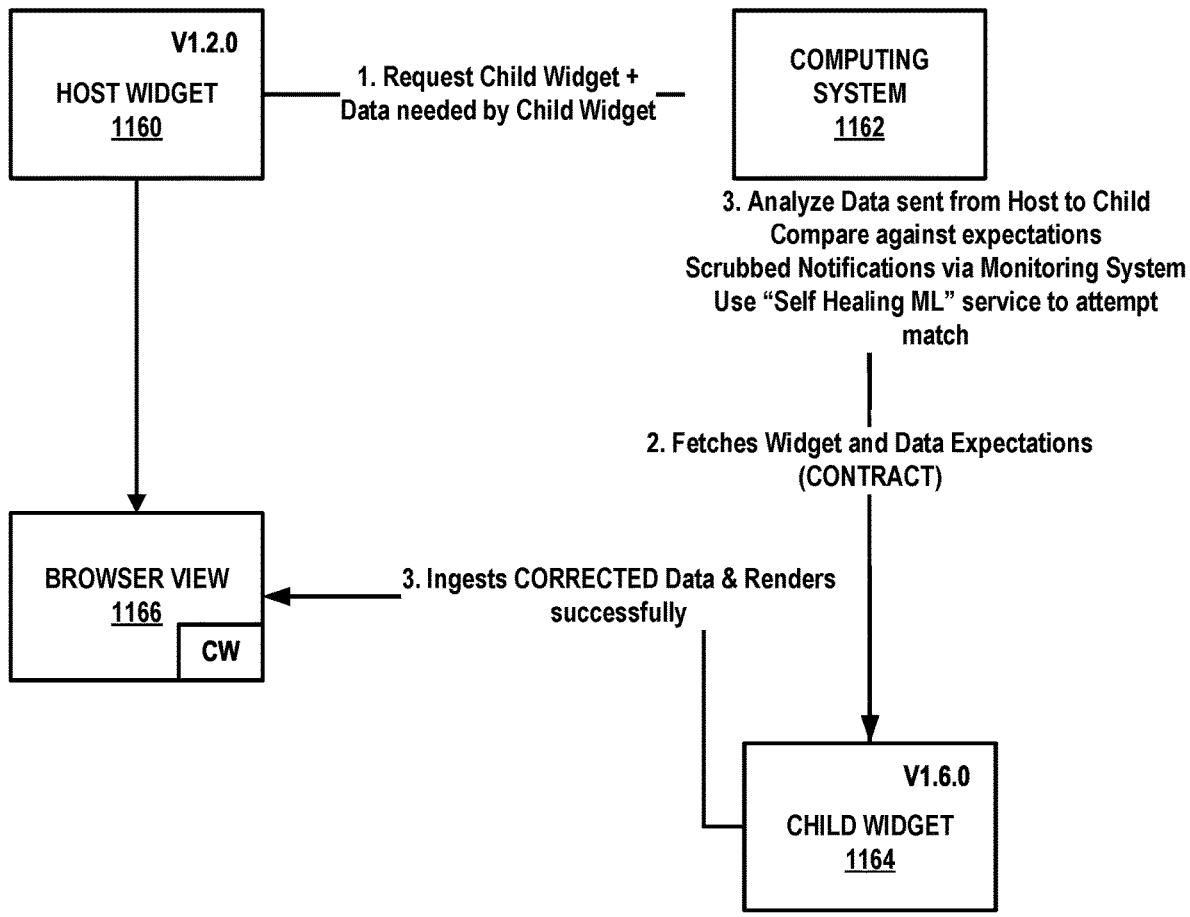
FIG. 11D is a conceptual diagram illustrating example widget contract application programming interface validation with an updated child widget that renders successfully using self-healing, in accordance with the techniques of this disclosure.

FIG. 11D is a conceptual diagram illustrating example widget contract application programming interface validation with an updated child widget that renders successfully using self-healing, in accordance with the techniques of this disclosure. FIG. 11D is discussed with FIGS. 1-8, 9A. 9B, 10, 11A, 11B, 11C for example purposes only. In the example of FIG. 11D, a developer may update child widget 1164 to be a different version (e.g., V.1.6.0) then one tested by developers of host widget 1160. For example, child widget 1144 may have changed a label for data from "DocID" to "DocumentId."

Similar to FIG. 11A, host widget 1160 may request, when executed by a client device (e.g., consumer computing device 160, client device 260A, or client device 660) and with computing system 1162, child widget 1164 and declarative expectations for child widget 1164. For example, the client device may request a software application for computing system 1142. The client device may fetch, with computing system 1162, host widget 1160 and child widget 1164. For example, computing system 1162 may provide instructions, configuration information identifying host widget 1160 and child widget 1164, and the declarative expectation for child widget 1164. The instructions may cause the client device to fetch host widget 1160 and child widget 1164 from a software repository. In the example of FIG. 11D, host widget 1160, when executed by the client device, generates contextual information.

In the example of FIG. 11D, the client device may analyze the contextual information generated by host widget 1160 with the declarative expectations for child widget 1164. In this example, the client device may send a notification that there is a mismatch (e.g., via email or other notification systems). In lower environments, the computing systems may render visible warning overlays with an "acknowledge" button for developers to click. That button may have telemetry to serve as evidence that the host and/or child team was aware of the issue.

The client device may use a self-healing process to attempt to match the mismatch. For example, the client device, with computing system 100, may apply lingual analysis to map "DocID" of the contextual information generated by hots widget 1160 with "DocumentID" of the declarative expectation for child widget 1164. In this example, child widget 1164 ingests the corrected contextual information and renders successfully in browser view 1166.

Figure 11E:
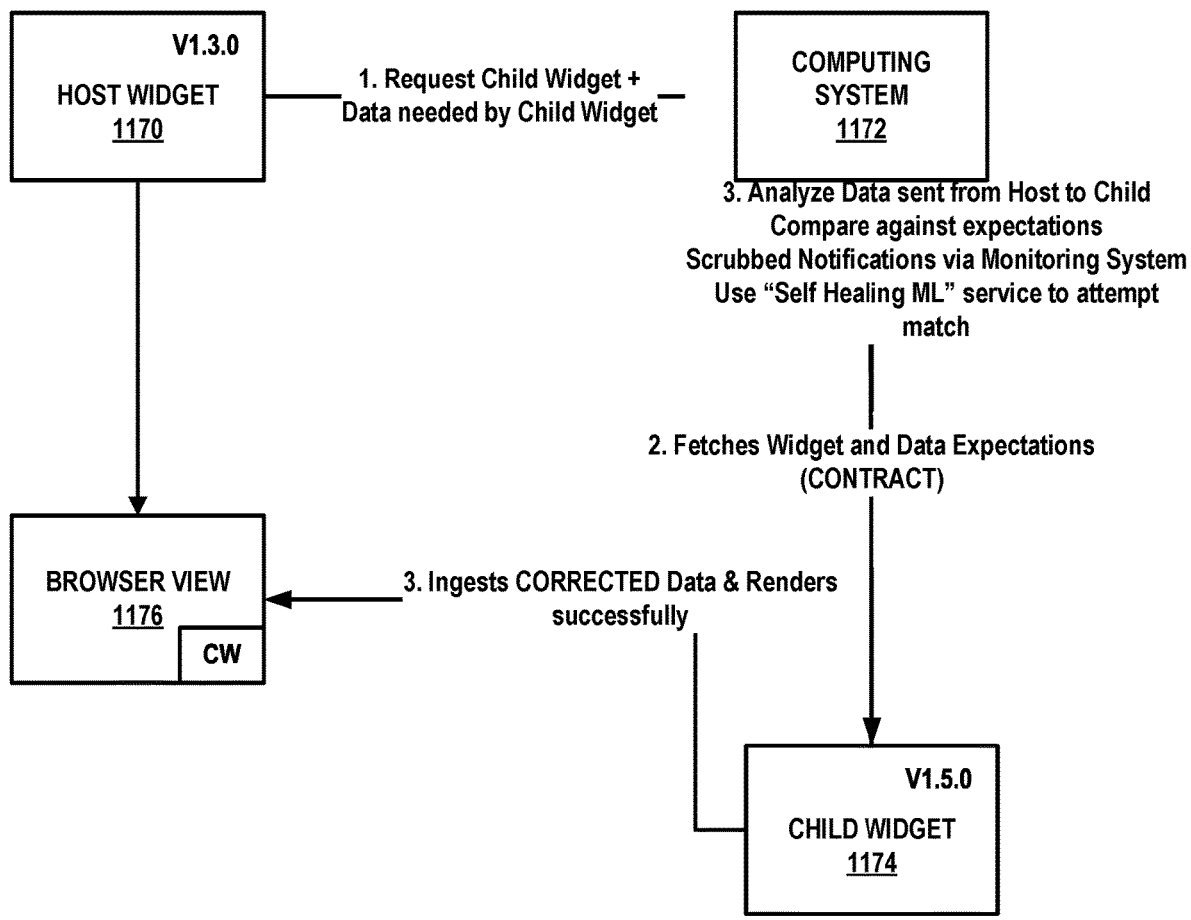
FIG. 11E is a conceptual diagram illustrating example widget contract application programming interface validation with an updated host widget that renders successfully using self-healing, in accordance with the techniques of this disclosure.

FIG. 11E is a conceptual diagram illustrating example widget contract application programming interface validation with an updated host widget that renders successfully using self-healing, in accordance with the techniques of this disclosure. FIG. 11D is discussed with FIGS. 1-8, 9A, 9B, 10, 11A, 11B, 11C for example purposes only. In the example of FIG. 11E, a developer may update host widget 1170 to be a different version (e.g., V.1.3.0) then one tested by developers of child widget 1174. For example, host widget 1170 may have changed a label for data from "DocumentId" to "DocID."

Similar to FIG. 11A, host widget 1170 may request, when executed by a client device (e.g., consumer computing device 160, client device 260A, or client device 660) and with computing system 1172, child widget 1174 and declarative expectations for child widget 1174. For example, the client device may request a software application for computing system 1172. The client device may fetch, with computing system 1172, host widget 1170 and child widget 1174. For example, computing system 1172 provides instructions, configuration information identifying host widget 1170 and child widget 1174, and the declarative expectation for child widget 1174. The instructions may cause the client device to fetch host widget 1170 and child widget 1174 from a software repository. In the example of FIG. 11D, host widget 1170, when executed by the client device, generates contextual information.

In the example of FIG. 11E, the client device may analyze the contextual information generated by host widget 1170 with the declarative expectations for child widget 1174. In this example, the client device may send a notification that there is a mismatch (e.g., via email or other notification systems). In lower environments, the computing systems may render visible warning overlays with an "acknowledge" button for developers to click. That button may have telemetry to serve as evidence that the host and/or child team was aware of the issue.

The client device may use a self-healing process to attempt to match the mismatch. For example, the client device, with computing system 100, may apply lingual analysis to map "DocID" of the contextual information generated by hots widget 1170 with "DocumentID" of the declarative expectation for child widget 1174. In this example, child widget 1174 ingests the corrected contextual information and renders successfully in browser view 1176.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A system comprising:
  processing circuitry; and
  non-transitory computer-readable storage media comprising logic that, when executed, causes the processing circuitry to:
    retrieve configuration information for a software application, the configuration information specifying a first widget and a second widget;
    generate a configuration file based on the configuration information for the software application;
    receive a request, from a client device, to execute the software application;
    based on to the request, generate instructions for executing the software application at the client device, wherein the instructions are configured to cause the client device to generate contextual information for the first widget and wherein the instructions cause the client device to determine whether the contextual information satisfies a declarative expectation for the second widget; and
    output, to the client device, the instructions and an indication of the configuration file to execute the software application.

2. The system of claim 1, wherein the instructions are further configured to cause the client device to load, based on a determination that the contextual information satisfies the declarative expectation for the second widget, the contextual information when executing the second widget.

3. The system of claim 1, wherein, to determine whether the contextual information satisfies the declarative expectation for the second widget, the instructions cause the client device to determine whether the contextual information includes one or more variables specified in the declarative expectation.

4. The system of claim 1, wherein, to determine whether the contextual information satisfies the declarative expectation for the second widget, the instructions cause the client device to determine whether the contextual information includes data in a data format specified in the declarative expectation.

5. The system of claim 1, wherein the instructions cause the client device to provide the software application at the client device and wherein the determination of whether the contextual information satisfies the declarative expectation for the second widget is performed by the client device while providing the software application at the client device.

6. The system of claim 1, wherein the instructions cause the client device to determine, based on a determination that the contextual information does not satisfy the declarative expectation for the second widget, modified contextual information that satisfies the declarative expectation and cause the client device to load the modified contextual information when executing the second widget.

7. The system of claim 6, wherein, to cause the client device to determine the modified contextual information, the instructions cause the client device to map a label for data of the contextual information that satisfies a similarity threshold to a label for the declarative expectation.

8. The system of claim 7, wherein, to cause the client device to map the label for the data of the contextual information, the instructions cause the client device to apply lingual analysis to the label for the data of the contextual information and the label for the declarative expectation.

9. The system of claim 7, wherein, to cause the client device to map the label for the data of the contextual information, the instructions cause the client device to determine a type format of the label for the data of the contextual information matches a type format of the label for the declarative expectation.

10. The system of claim 6, wherein the instructions further cause the client device to output, based on a determination that the contextual information does not satisfy the declarative expectation for the second widget and that the modified contextual information satisfies the declarative expectation, a notification to the system, the notification indicating that the contextual information does not satisfy the declarative expectation for the second widget and that the client device corrected a violation.

11. The system of claim 1, wherein the instructions further cause the client device to output, based on a determination that the contextual information does not satisfy the declarative expectation for the second widget, a notification to the system, the notification indicating that the contextual information does not satisfy the declarative expectation for the second widget.

12. The system of claim 11, wherein the logic further causes the processing circuitry to output, in response to receiving the notification from the client device, the notification to a developer computing device.

13. The system of claim 1, wherein the logic further causes the processing circuitry to:
  determine the declarative expectation for the second widget; and
  in response to the request, output, to the client device, the declarative expectation for the second widget.

14. The system of claim 1, wherein the instructions are configured for execution by a web browser of the client device.

15. The system of claim 1, wherein the first widget comprises a plugin configured to provide a graphical user interface for the software application and wherein the contextual information is generated based on plugin configuration information.

16. The system of claim 1, wherein the contextual information comprises host data, wherein the host data specifies data associated with the first widget and wherein the second widget is configured to execute a portion of the software application using the host data.

17. The system of claim 1, wherein the contextual information comprises platform data, wherein the second widget is configured to execute a portion of the software application using the platform data.

18. A method comprising:
  retrieving, by processing circuitry, configuration information for a software application, the configuration information specifying a first widget and a second widget;
  generating, by the processing circuitry, a configuration file based on the configuration information for the software application;
  receiving, by the processing circuitry, a request, from a client device, to execute the software application;
  based on to the request, generating, by the processing circuitry, instructions for executing the software application at the client device, wherein the instructions are configured to cause the client device to generate contextual information for the first widget and wherein the instructions cause the client device to determine whether the contextual information satisfies a declarative expectation for the second widget; and
  outputting, by the processing circuitry, to the client device, the instructions and an indication of the configuration file to execute the software application.

19. The method of claim 18,
  wherein the instructions cause the client device to determine, based on a determination that the contextual information does not satisfy the declarative expectation for the second widget, modified contextual information that satisfies the declarative expectation and causes the client device to load the modified contextual information when executing the second widget;
  wherein, to cause the client device to determine the modified contextual information, the instructions cause the client device to map a label for data of the contextual information that satisfies a similarity threshold to a label for the declarative expectation; and
  wherein, to cause the client device to map the label for the data of the contextual information, the instructions cause the client device to:
    apply lingual analysis to the label for the data of the contextual information and the label for the declarative expectation; and/or
    determine a type format of the label for the data of the contextual information matches a type format of the label for the declarative expectation.

20. Computer-readable storage media comprising logic that, when executed, configures processing circuitry to:
  retrieve configuration information for a software application, the configuration information specifying a first widget and a second widget;
  generate a configuration file based on the configuration information for the software application;
  receive a request, from a client device, to execute the software application;
  based on to the request, generate instructions for executing the software application at the client device, wherein the instructions are configured to cause the client device to generate contextual information for the first widget and wherein the instructions cause the client device to determine whether the contextual information satisfies a declarative expectation for the second widget; and
  output, to the client device, the instructions and an indication of the configuration file to execute the software application.

* * * * *